(12) United States Patent
Elshafie et al.

(10) Patent No.: US 12,395,987 B2
(45) Date of Patent: Aug. 19, 2025

(54) EXPLOITING UNUTILIZED TRANSMISSION OCCASIONS

(71) Applicant: QUALCOMM Incorporated, San Diego, CA (US)

(72) Inventors: Ahmed Elshafie, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 17/714,887

(22) Filed: Apr. 6, 2022

(65) Prior Publication Data

US 2023/0328731 A1    Oct. 12, 2023

(51) Int. Cl.
  *H04W 72/20*    (2023.01)
  *H04B 7/0413*   (2017.01)
  *H04W 72/12*    (2023.01)

(52) U.S. Cl.
  CPC .......... *H04W 72/20* (2023.01); *H04B 7/0413* (2013.01); *H04W 72/12* (2013.01)

(58) Field of Classification Search
  CPC ..... H04W 72/20; H04W 72/12; H04W 72/40; H04W 72/25; H04W 76/23; H04B 7/0413; H04L 5/0053
  See application file for complete search history.

(56) References Cited

U.S. PATENT DOCUMENTS

| | | | |
|---|---|---|---|
| 2018/0054237 A1* | 2/2018 | Tseng | H04W 36/0022 |
| 2018/0206176 A1 | 7/2018 | Panteleev et al. | |
| 2021/0243726 A1* | 8/2021 | Osawa | H04W 72/20 |
| 2022/0272679 A1* | 8/2022 | Wang | H04W 72/20 |
| 2022/0407636 A1* | 12/2022 | Yoshioka | H04L 1/1812 |

FOREIGN PATENT DOCUMENTS

| | | | |
|---|---|---|---|
| WO | 2016073111 A1 | 5/2016 | |
| WO | 2020068252 A1 | 4/2020 | |
| WO | WO-2020197645 A1 * | 10/2020 | ........ H04W 72/0406 |
| WO | 2021184168 A1 | 9/2021 | |

OTHER PUBLICATIONS

International Search Report and Written Opinion—PCT/US2023/064360—ISA/EPO—Jun. 15, 2023.
Samsung: "Mode3/Mode 4 Resource Pool Sharing on V2X Phase 2", 3GPP TSG RAN WG2 Meeting #99bis, R2-1711754_POOLSHARING, 3rd Generation Partnership Project (3GPP), Mobile Competence Centre, 650, Route Des Lucioles, F-06921 Sophia-Antipolis Cedex, France, vol. RAN WG2, No. Prague, Czechia, Oct. 9, 2017-Oct. 13, 2017, 4 p. Oct. 8, 2017 (Oct. 8, 2017), XP051343710, p. 1, paragraph 2, p. 3, paragraph 3, figures 1, 2.

* cited by examiner

*Primary Examiner* — Won Tae C Kim
(74) *Attorney, Agent, or Firm* — Patterson & Sheridan, L.L.P.

(57) ABSTRACT

Certain aspects of the present disclosure provide techniques for method for wireless communications by a first user equipment (UE), generally including receiving sidelink configuration information configuring the first UE with at least initial transmission occasions for initial sidelink transmissions using shared sidelink resources and transmitting an indication, to at least a second UE that uses the shared sidelink resources, that the first UE intends to skip at least one of the initial transmission occasions or one or more retransmission occasions scheduled for retransmission of an initial transmission.

28 Claims, 14 Drawing Sheets

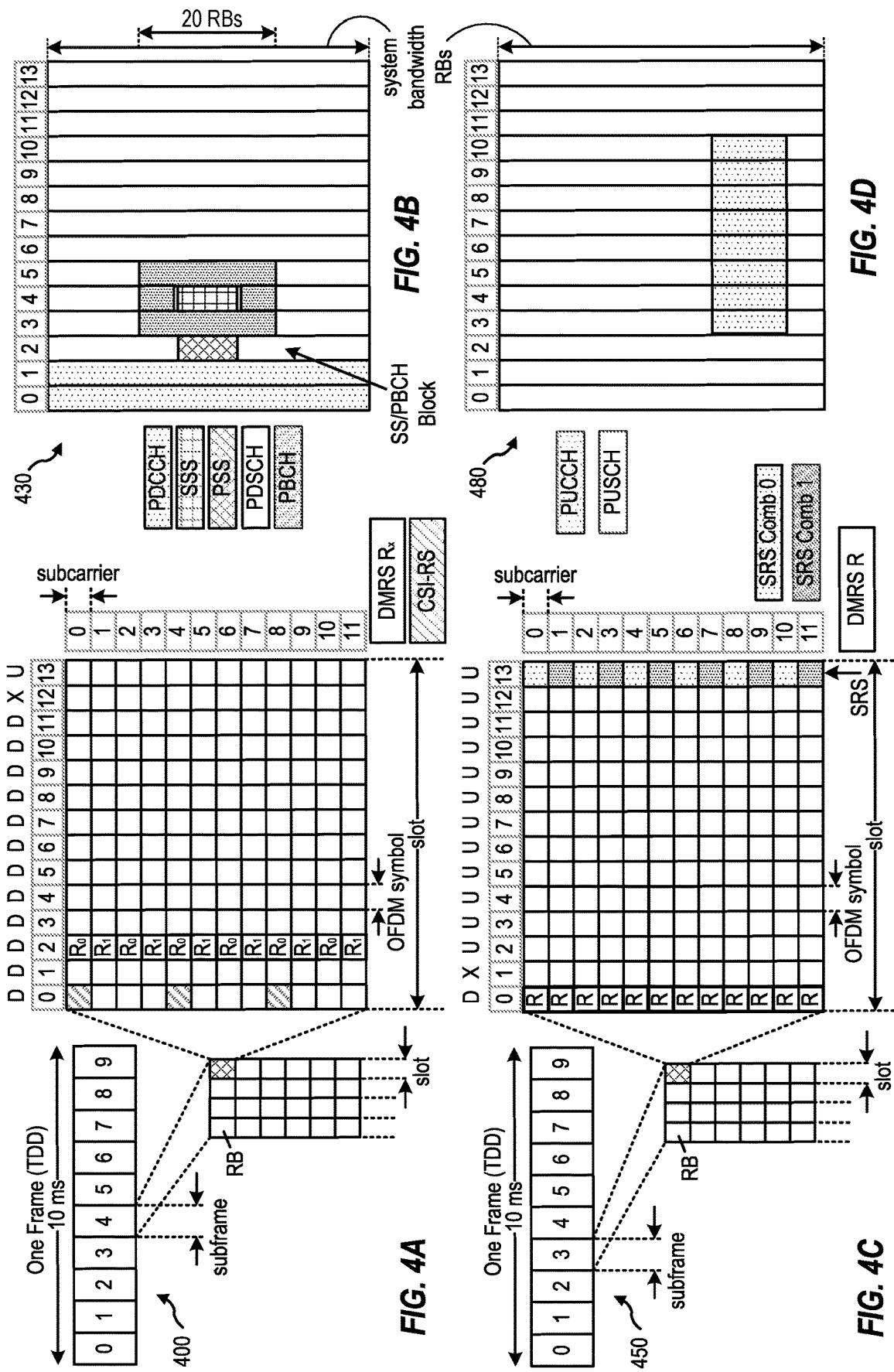

EXPLOITING UNUTILIZED TRANSMISSION OCCASIONS

BACKGROUND

Field of the Disclosure

Aspects of the present disclosure relate to wireless communications, and more particularly, to techniques designed to enhance resource utilization.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a first user equipment (UE), including receiving sidelink configured grant (CG) configuration information configuring the first UE with at least initial transmission occasions for initial sidelink transmissions using shared sidelink resources; and transmitting an indication, to at least a second UE that uses the shared sidelink resources, that the first UE intends to skip at least one of the initial transmission occasions or one or more retransmission occasions scheduled for retransmission of an initial transmission.

One aspect provides a method for wireless communication by a second UE, including receiving signaling indicating that a first UE intends to skip at least one of an initial transmission occasion for an initial sidelink transmission using shared sidelink resources or a retransmission occasion scheduled for retransmission of an initial transmission and transmitting, using the shared sidelink resources, during the at least one of the initial transmission occasion or retransmission occasion that the signaling indicates the first UE intends to skip.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

DETAILED DESCRIPTION

Aspects of the present disclosure provide apparatuses, methods, processing systems, and computer-readable mediums for exploiting unutilized sidelink resources.

For example, the techniques may help utilize sidelink resources configured for initial transmissions or retransmissions that would otherwise be unutilized. In certain wireless communications systems, resources that are (pre-)allocated to devices for transmission may ultimately not be used, resulting in resource waste.

For example, for sidelink communications between user equipments UEs), a network entity (e.g., a base station such as a gNB) may configures a UE with a set of periodic resources, referred to as configured grant (CG) occasions that the UE can use for first (initial) transmission of a transport block (TB). These CG occasions for initial TB transmissions may be referred to as initial Tx occasions. In some systems, each TB can also be retransmitted in two future transmission occasions (for a maximum of three scheduled resources per TB in total). These CG occasions for TB re-transmissions may be referred to as re-transmission (ReTX) occasions.

It is possible that some or all of these schedule resources may not be utilized. For example, if the Tx UE has not TB to transmit, the initial Tx occasion will not be used. Further, if an initial transmission is positively acknowledged (ACK'ed) via a physical sidelink feedback channel (PFSCH), the ReTX occasions will not be used. Thus, if a Tx UE has no TB or receives a positive acknowledgment, the corresponding Tx occasion resources are wasted.

Aspects of the present disclosure, however, provide a mechanism for utilizing these conventionally unutilized resources. In some cases, a Tx UE may signal an indication that it is not going to use scheduled resources and these resources are available. For example, the Tx UE may signal an indication that an initial Tx occasion is not going to be utilized if it has not TB to transmit and/or may signal an indication that one or more ReTX occasions are not going to be utilized if the Tx UE has received an ACK.

Thus, the techniques proposed herein may help avoid resource waste and achieve improved resource utilization.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

Figure 1:
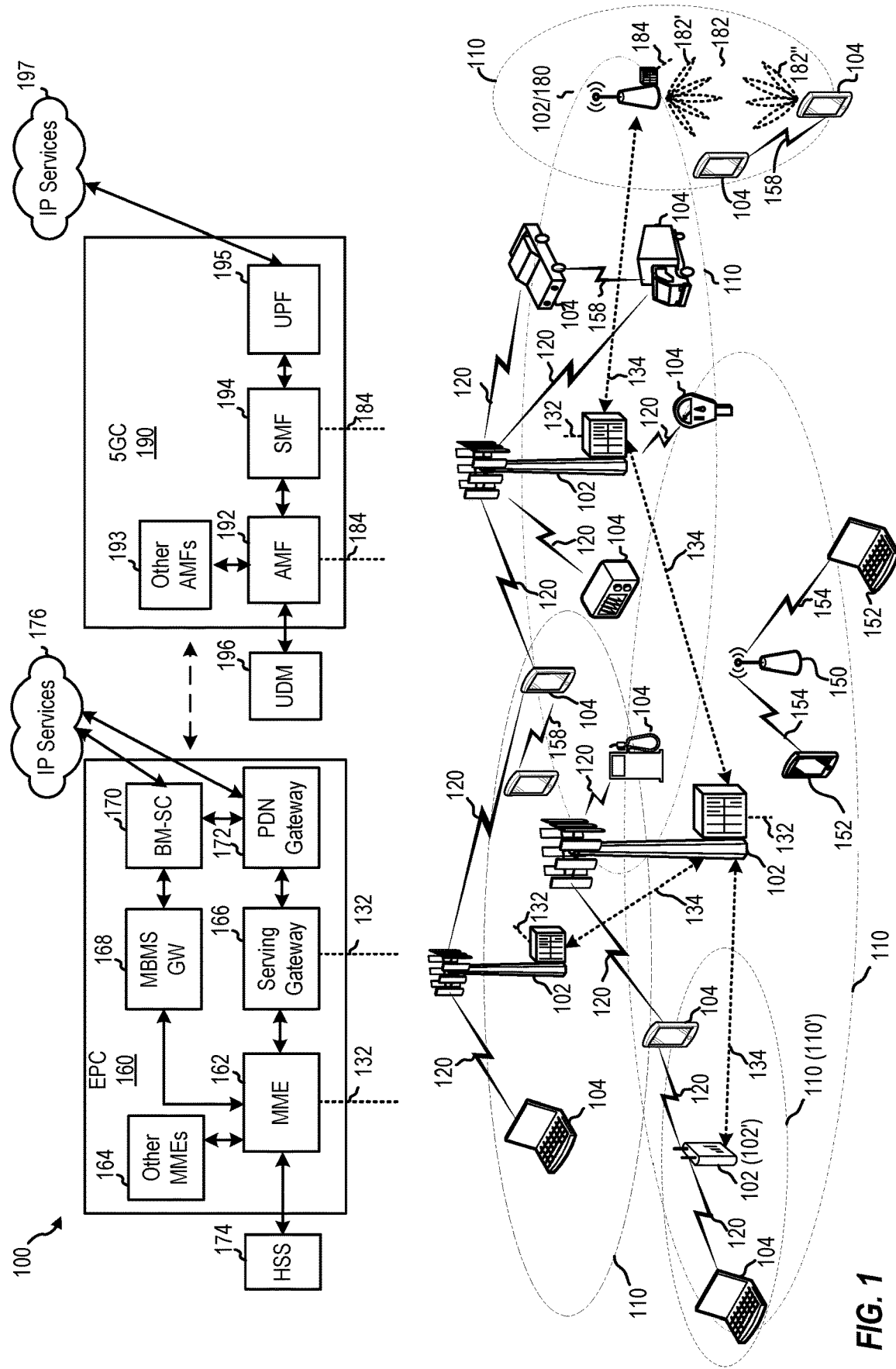
FIG. 1 depicts an example wireless communication network.

FIG. 1 depicts an example of a wireless communication network 100, in which aspects described herein may be implemented.

Generally, wireless communication network 100 includes various network entities (alternatively, network elements or network nodes). A network entity is generally a communications device and/or a communication function performed by a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). ABS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
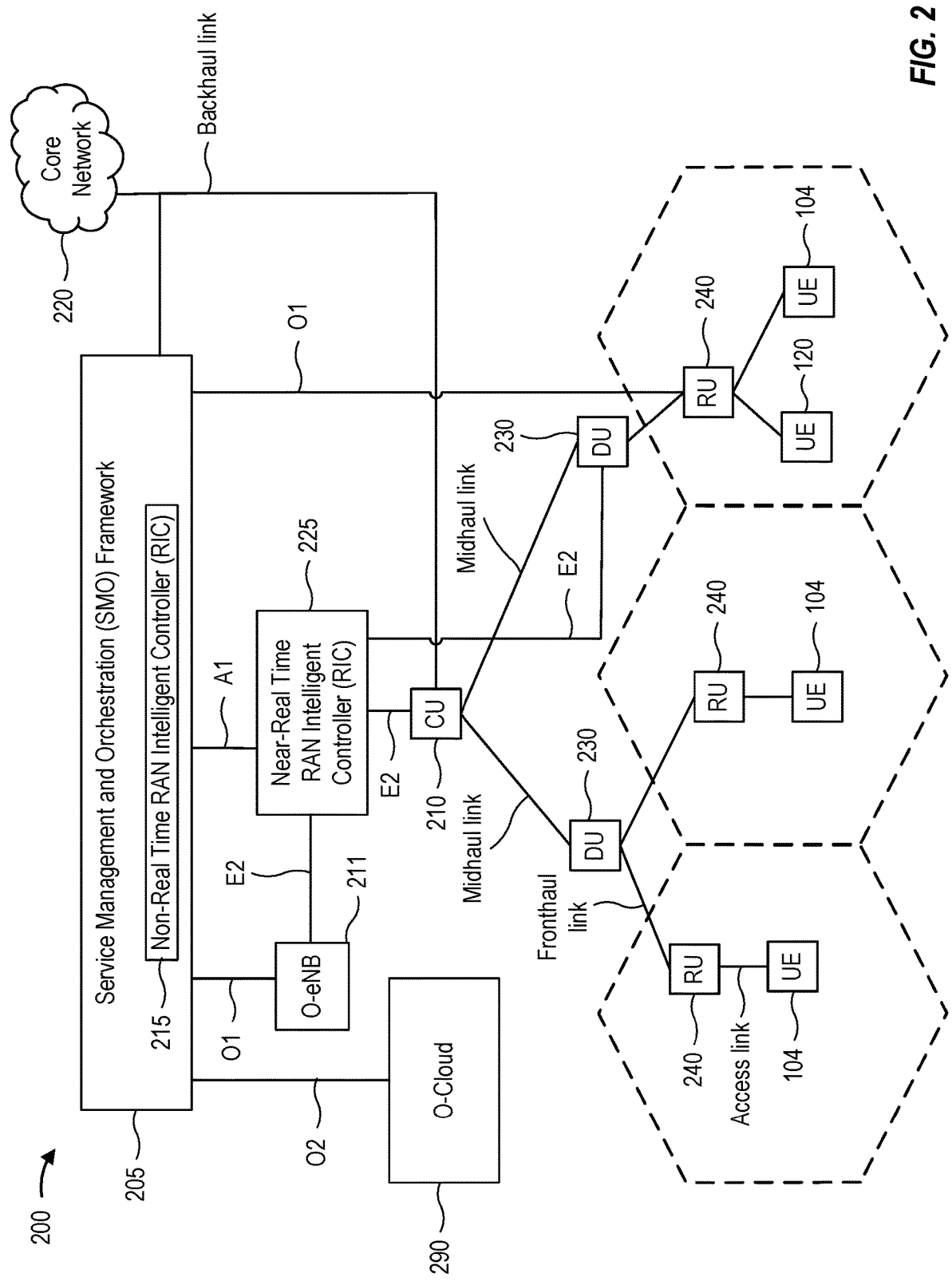
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". BS 180 may also receive the beamformed signal from UE 104 in one or more receive directions 182'. Base station 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium.

Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT MC 225.

In some implementations, to generate AI/ML models to be deployed in the Near-RT MC 225, the Non-RT RIC 215 may receive parameters or external enrichment information from external servers. Such information may be utilized by the Near-RT MC 225 and may be received at the SMO Framework 205 or the Non-RT MC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
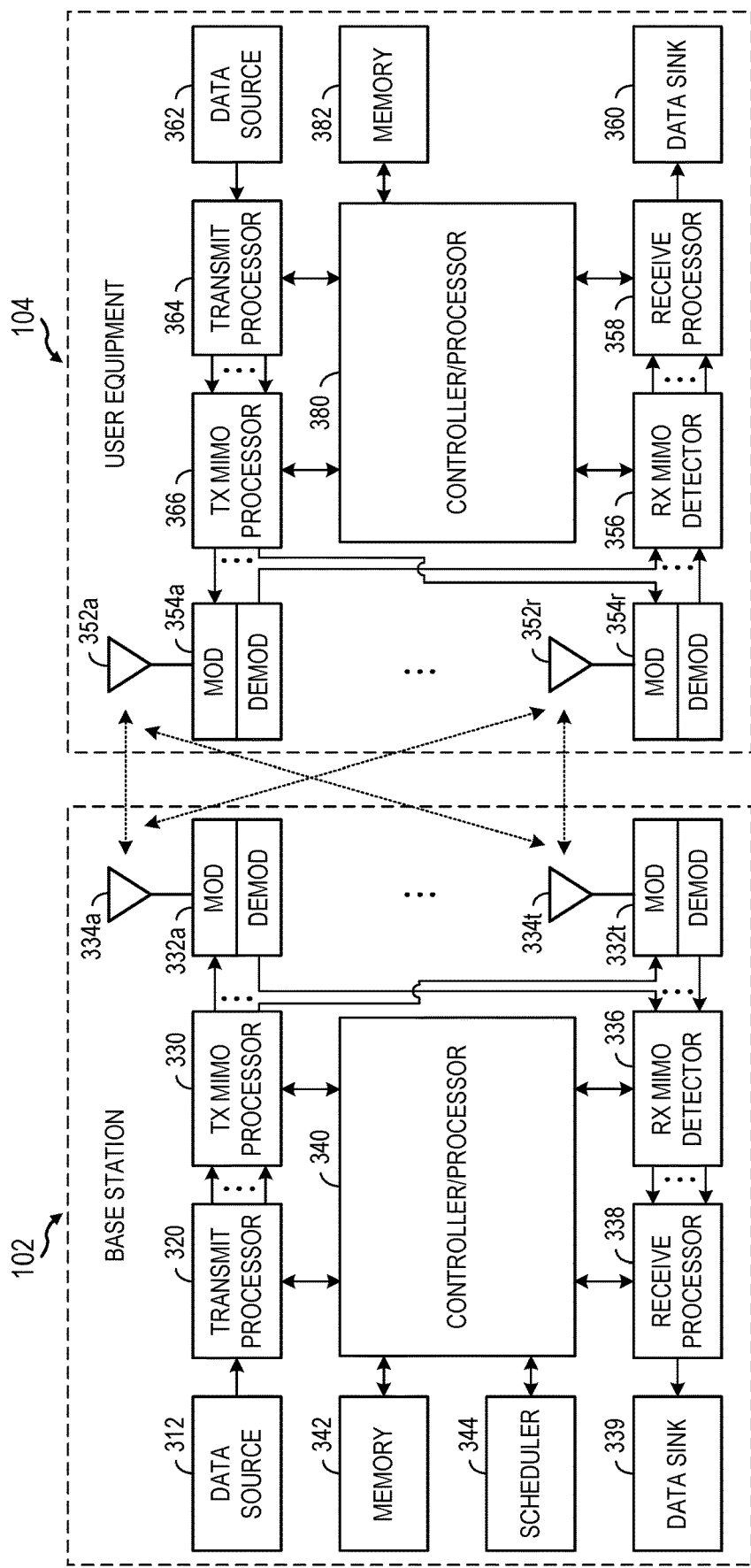
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI)

(dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include mini-slots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of Sidelink Communications

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figures 5A, 5B:
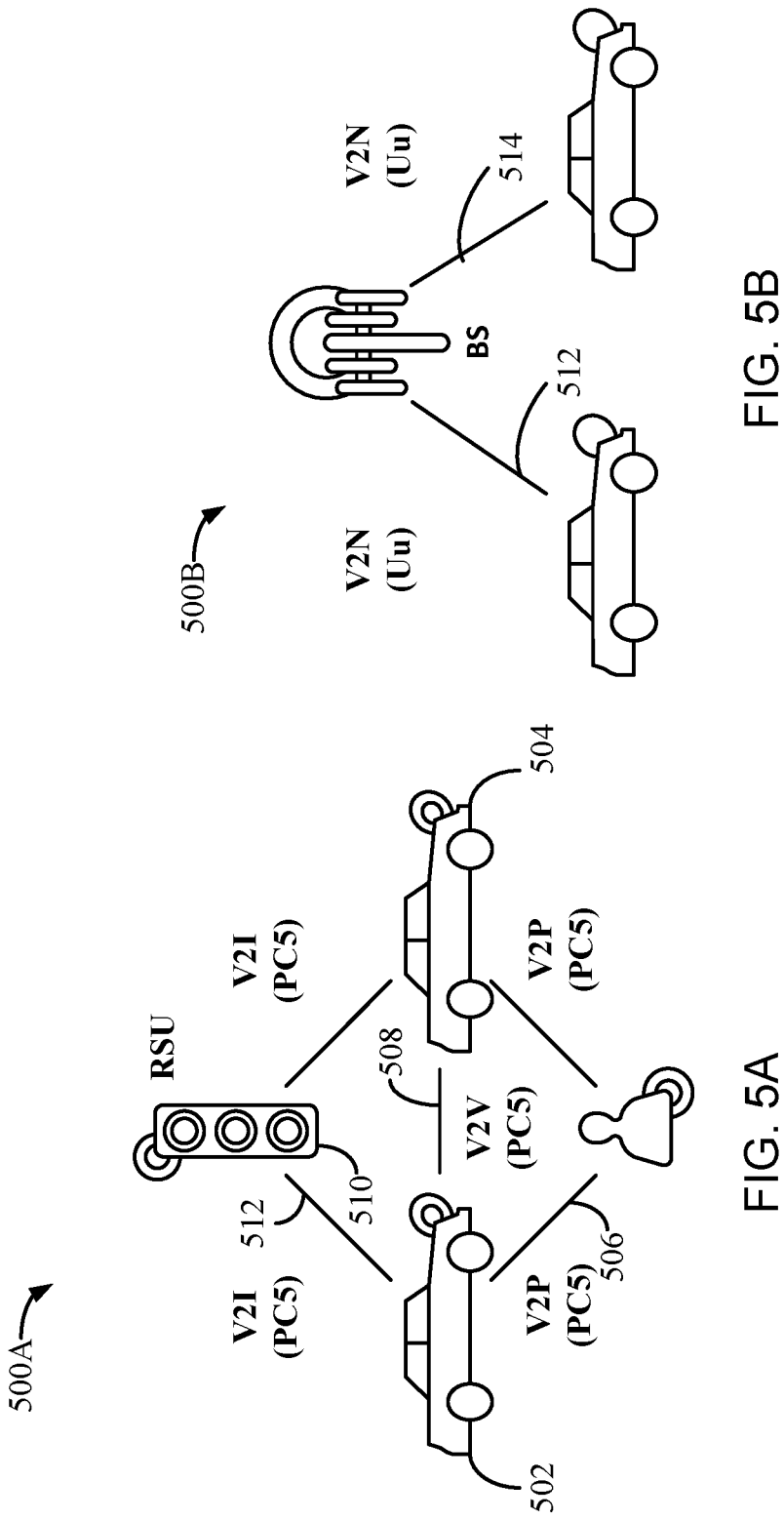
FIGS. 5A and 5B show diagrammatic representations of example vehicle to everything (V2X) systems, in accordance with some aspects of the present disclosure

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B, provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 500 for communication between a vehicle 502 and a vehicle 504 through a network entity 506. These network communications may occur through discrete nodes, such as a base station (for example, an eNB or gNB), that sends and receives information to and from (for example, relays information between) vehicles 502, 504. The network communications through vehicle to network (V2N) links 512 and 514 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications.

Overview of SL MU-MIMO

Figure 6A:
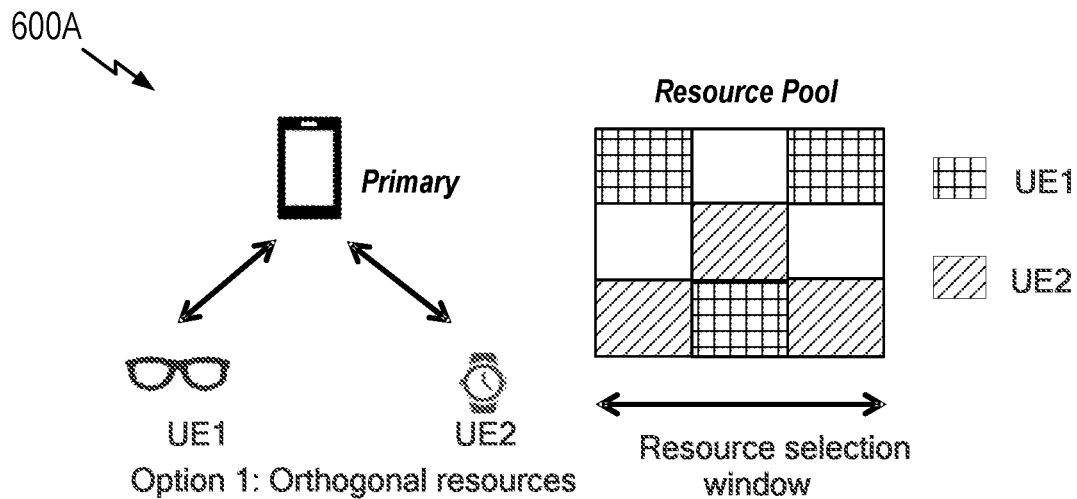
FIGS. 6A and 6B depicts example resource selection for multiple input/multiple output wireless communications, according to various aspects described herein.
Figure 6B:
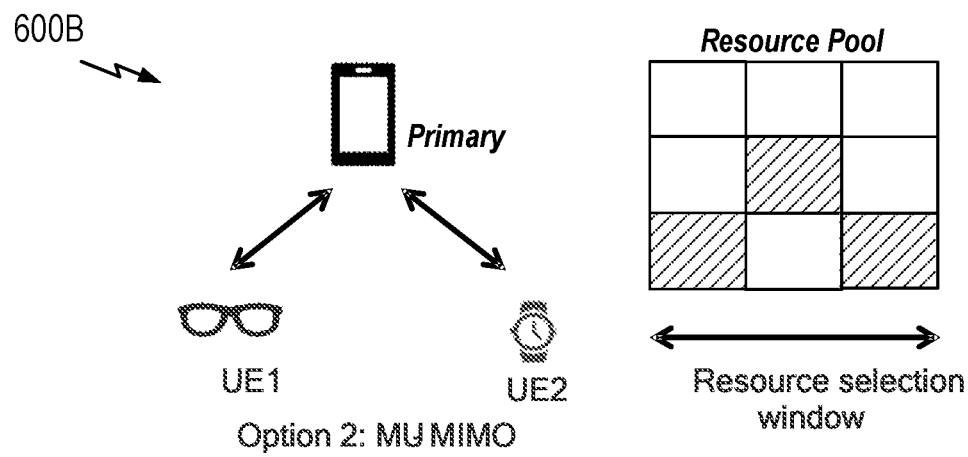

In some cases, sidelink (SL) UEs may transmit in a multiple user multiple input multiple output (MU-MIMO) mode. In such cases, as illustrated in FIGS. 6A and 6B, a primary UE may can transmit to/receive from multiple remote UEs on shared resources (of a shared resource pool). As illustrated in FIG. 6A, the remote UEs could be assigned orthogonal (non-overlapping) resources. In such cases, the UEs could operate in MU or single user (SU) mode.

As illustrated in FIG. 6B, the remote UEs could be assigned the same resources. For example, in such cases, the primary UE could guide the remote UEs to transmit on indicated ports. As an example, assuming Mode 1 operation (where a gNB schedules the remote UEs) or the primary UE schedules the remote UEs, the remote UEs can be instructed to transmit on the same resources, with transmission parameters designed to help ensure separability at the receiver.

Overview of PSFCH Resource Mapping

Figure 7A:
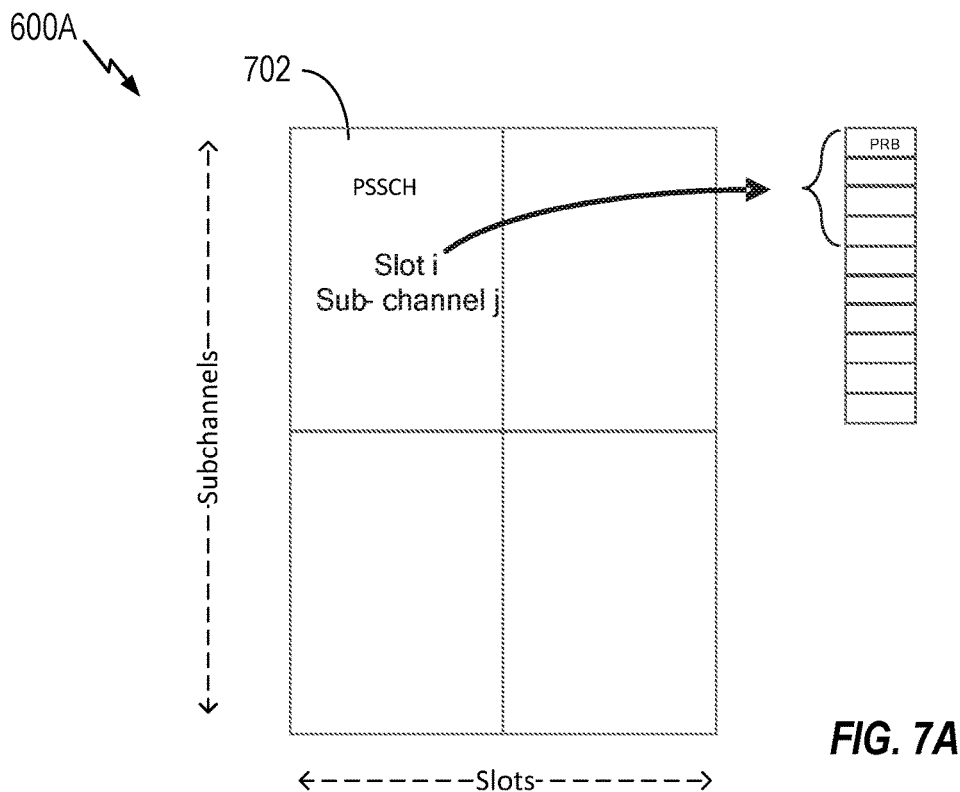
FIGS. 7A and 7B depict examples of physical sidelink feedback shared channel (PSFCH) resource mapping, according to various aspects described herein.

FIG. 7A is an example of how resources of a common resource pool 600A may be allocated for sidelink communications (broadcast and groupcast device-to-device or D2D) between UEs (e.g., UEs 104 shown in FIG. 1). The common resource pool 600A includes slots and subchannels. Resources may be allocated as combinations of subchannels and slots, used for physical sidelink shared channel (PSSCH) 602 transmissions. In the illustrated example, PSSCH is allocated one slot (slot i) and one sub-channel (j).

FIG. 7A also depicts how PSSCH may be mapped to physical sidelink feedback channel (PSFCH) resources. In general, there is a mapping between a PSSCH and the corresponding PSFCH resource based on the starting sub-channel of PSSCH (sl-PSFCH-CandidateResourceType is configured as startSubCH). The mapping could also be based on the number of subchannels in a PSSCH (sl-PSFCH-CandidateResourceType is configured as alloc-SubCH), the slot containing PSSCH, the source ID, and the destination ID. The number of available PSFCH resources may be dictated by the number of UEs or UE pairs sharing the resource pool 600A (e.g., the number of UEs in groupcast option 2).

Figure 7B:
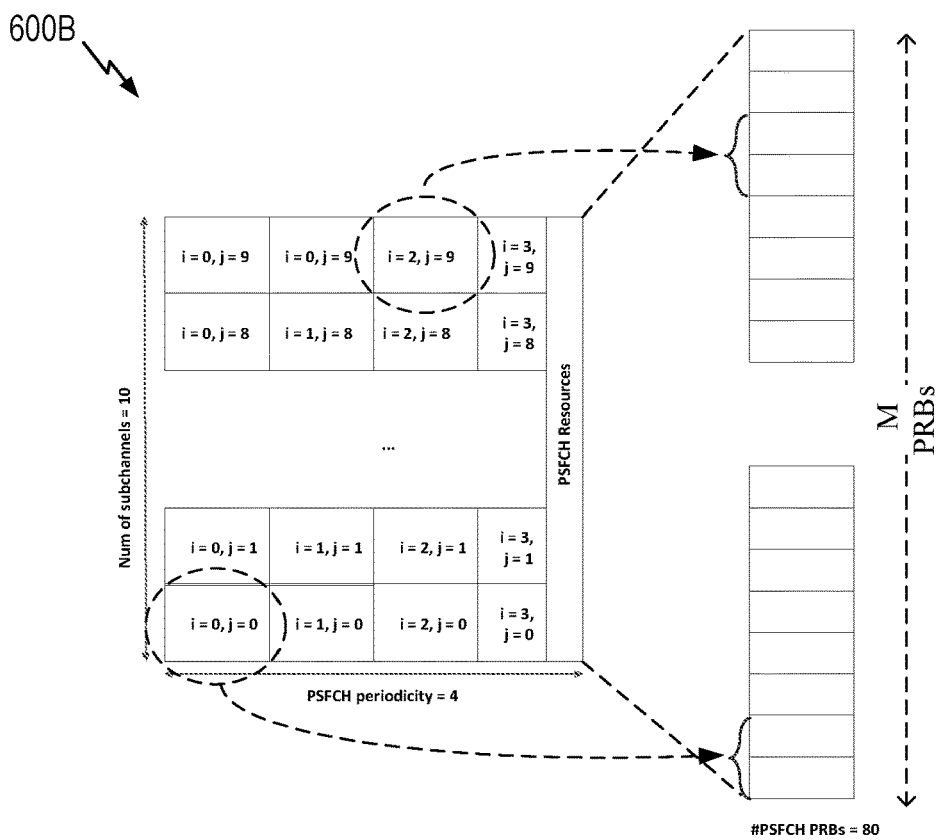

FIG. 7B depicts an example of PSFCH resource determination, based on a mapping of subchannels/slots (i, j), in greater detail. In general, a UE may allocate physical resource blocks (PRBs) from $M_{PRB,set}^{PSFCH}$ PRBs to slot i and sub-channel j of resource pool 600B (allocated for PSSCH transmissions), as follows:

$$[(i+j \cdot N_{PSSCH}^{PSFCH}) \cdot M_{Subch,slot}^{PSFCH}, (i+1+ j \cdot N_{PSSCH}^{PSFCH}) \cdot M_{subch,slot}^{PSFCH} - 1],$$

PRBs from $M_{PRB,set}^{PFCH}$ PRBs to slot i and sub-channel j, where i is between 0 and the PSFCH periodicity $N_{PSSCH}^{PSFCH}$ and j is between 0 and the total number of sub-channels $N_{subch}$:

$$0 \leq i \leq N_{PSSCH}^{PSFCH} \text{ and } 0 \leq j \leq N_{subch}.$$

In the illustrated example, $N_{PSSCH}^{PSFCH}=4$ and $N_{subch}=10$, and the total number of PRBs for PSFCH is 80, so the number of PSFCH PRBs per PSFCH is 2:

$$M_{subch,slot}^{PSFCH} = N_{PSFCH\_PRBs}/(N_{PSSCH}^{PSFCH} * N_{subch})$$
$$= 80/(4*10) = 2.$$

In other words, in this example, each PSSCH slot/sub-channel is associated with 2 PSFCH PRBs (though PSFCH may be only sent on one of them).

Aspects Related to Exploiting Unutilized Transmission Occasions

As noted above, in some cases, periodically scheduled resources for sidelink transmissions (e.g., PSSCH) may not be utilized. For example, if the Tx UE has no TB to transmit, PSSCH resources scheduled for an initial Tx occasion will not be used. Further, if an initial transmission is positively acknowledged (ACK'ed) via a PFSCH, the resources allocated/scheduled for ReTX occasions will not be used. Thus, if a Tx UE has no TB or receives a positive acknowledgment, the corresponding resources scheduled for these Tx occasions are wasted.

Aspects of the present disclosure, however, provide a mechanism for utilizing these conventionally unutilized resources. In some cases, a Tx UE may signal an indication that it is not going to use scheduled resources and these resources are available. For example, the Tx UE may signal an indication that an initial Tx occasion is not going to be utilized if it has no TB to transmit and/or may signal an indication that one or more ReTX occasions are not going to be utilized if the Tx UE has received an ACK. In some cases, the Tx UE may explicitly signal an indication of used or unused occasions (e.g., of a positively acknowledged TB) to other UEs. In some cases, information regarding used or unused occasions may be relayed to other UEs by an entity other than the Tx UE (e.g., by a UE, controller, or network entity/gNB) that obtained such information itself by any of the techniques described herein.

Figure 8:
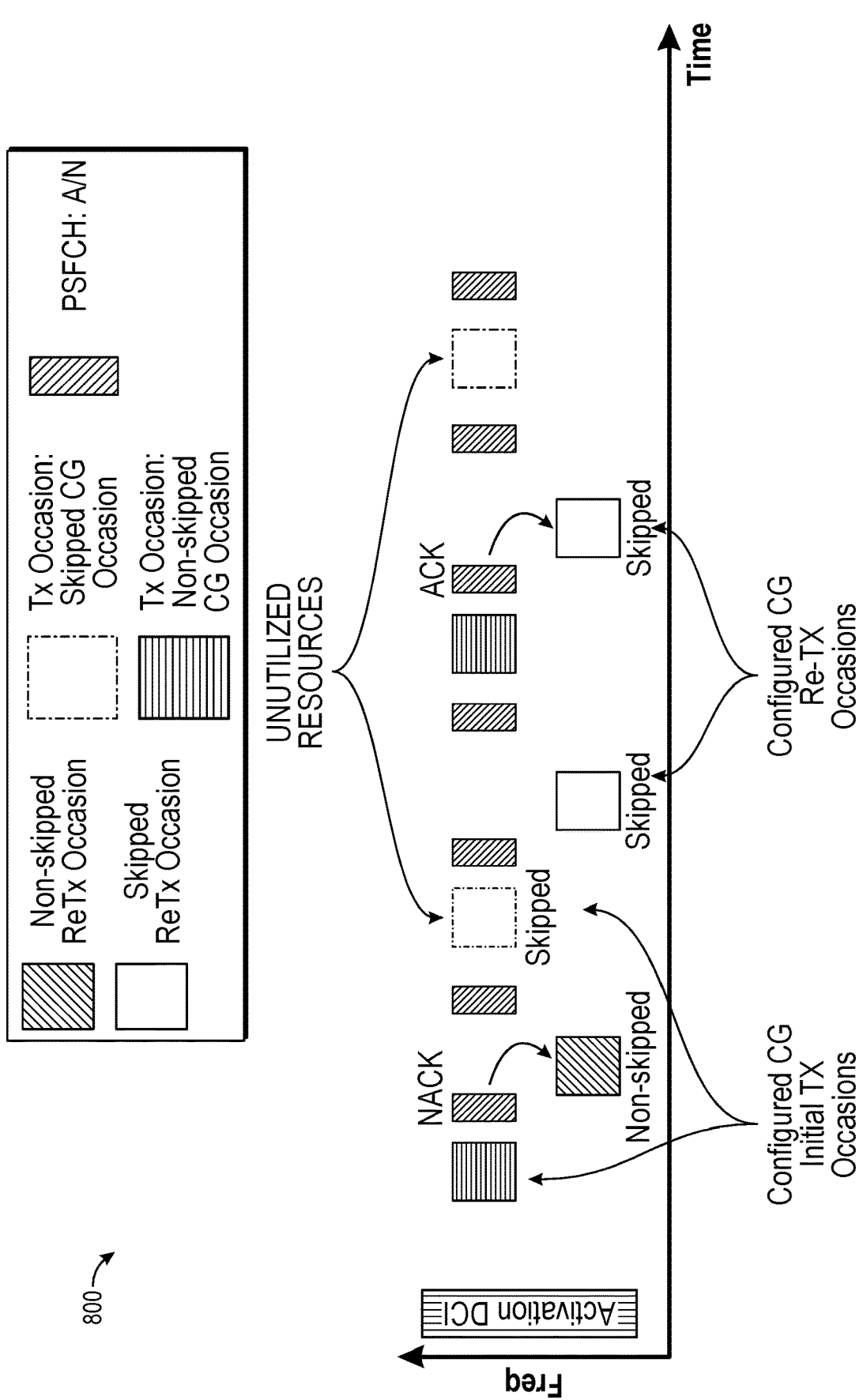
FIG. 8 depicts example sidelink configured grant (CG) transmission occasions.

Examples of how resources allocated for Tx occasions may be wasted are illustrated in FIG. 8. In conventional sidelink scenarios (e.g., according to NR Release 16 V2X), a gNB may configure a UE with configured grants (CGs) of different types, type 1 and type 2. The general difference between type 1 and type 2 CG configurations is that type 2 is activated with DCI, and the reTx resources are scheduled in DCI (whereas in type 1, all Init Tx and RETx resources are configured via RRC).

The example illustrated in FIG. 8 assumes type 1 CGs with an activation DCI. As illustrated, a gNB may configure a UE with a set of periodic resources/CG occasions to be used for initial transmission of new transport blocks (TBs), referred to as initial Tx occasions. Each TB may also be retransmitted in up to two future resources, in ReTX occasions (e.g., for a maximum of 3 scheduled resources per TB). In FIG. 8, every other Init-TX is skipped, meaning these resources, as well as the corresponding ReTX resources are wasted.

In the example illustrated in FIG. 8, there is a single (1) scheduled ReTX occasion for each TB, where these resources are only utilized by the Tx UE if the original TB was negatively acknowledged (NACK'ed), as indicated by a PSFCH. As described above, PSFCH has a certain periodicity, and a TB cannot typically be retransmitted before its corresponding ACK/NACK is sent (in the PSFCH resources according to the resource mapping described above).

Thus, because ReTX occasions are only used when needed, the CG process can be imagined as that a NACK (conveyed via PSFCH) activates the use of these resources. In conventional systems, the gNB indicates in DCI the time/frequency offsets of these resources (assuming resource sizes are the same across all transmissions). These indicated resources are utilized whenever a NACK is observed, but if no NACK, then these resources are wasted.

In the example illustrated in FIG. 8, the first non-skipped Init-TX CG Occasion is NACK'ed, therefore the first ReTX Occasion is not skipped. On the other hand, the second non-skipped Init-TX CG Occasion is ACK'ed, therefore the ReTX Occasion for this Init-TX is not skipped.

As illustrated by the example in FIG. 8, there are two cases of configured resources that can be exploited: skipped Init TX Occasions (skipped if a TX UE has no TB to transmit) and skipped ReTX Occasions (skipped if the TX UE has not TB to transmit or if an Init TX is ACK'ed).

Resources may be exploited to advantage, particularly when a group of UEs share a common resource pool (transmitting on the same resources) and are operating in a multiple user multiple input multiple output (MU-MIMO) mode. In other words, if a first UE learns a second UE is going to skip a Tx Occasion (whether Init Tx or ReTX), the first UE may transmit using a single user (SU) MIMO mode rather than MU MIMO mode and transmit using different Tx parameters than if the second UE were transmitting on the same resources. Thus, exploited resources, in this context, may mean that UEs transmit using different power levels, different demodulation reference signal (DMRS) patterns, a higher number of ports (e.g., rate-matching around the ports that were going to be used by the other UE is not needed), than when the original UE is not using the resources. The techniques described herein for exploiting skipped resources may be applied in various cases, such as Mode 1 resource allocation (RA), where a gNB schedules a maximum of 2 ReTxs for a single TB, as well as Mode 2 RA, where a UE reserves up to 2 resources for ReTx.

Aspects of the present disclosure provide techniques for exploiting the skipped (Tx and ReTx) resources/occasions from CGs, where TX-UEs performing MU-MIMO on the same resources, as described above with reference to FIG. 6B, can exploit all dimensions once the other TX-UE has no traffic (no TB) or an ACK is observed after a Tx occasion (hence, all ReTx occasions are wasted). The techniques described herein may be applied in a variety of scenarios, for example, where there is a main/primary node using a set of resources shared with Mother nodes, when the primary node is not planning to use the resources.

The techniques described herein for exploiting the skipped (Tx and ReTx) resources/occasions from CGs may be utilized for Mode 1 as well as Mode 2 resource allocation. In Mode 1 RA, UEs request resources to a network entity (e.g., base station/gNB) for the transmission of each TB (and possible blind or HARQ retransmissions). UEs send a Scheduling Request (SR) to the gNB using the physical uplink control channel (PUCCH), and the gNB responds with the DCI conveyed via a physical downlink control channel (PDCCH). The DCI indicates the SL resources allocated for the transmission of a TB and up to 2 ReTxs. Hence, similar to the case of configure grants, in Mode 1 RA, the ReTx resources can be exploited by other UEs.

In Mode 2 RA, the TX-UE/RX-UE will handle the search for resources and for ReTx resources. UEs operating in Mode 2 RA may also exploit skipped (Tx and ReTx) resources/occasions. For example, UEs operating in Mode 2 RA may monitor ("listen") for PSFCH transmissions acknowledging transmissions. In such cases, the UEs may be able to exploit (re-use) the corresponding ReTX resources that will not be used due to the positive acknowledgment.

Aspects of the present disclosure may help avoid wasting unutilized resources, for example, in a MU-MIMO setting (as shown in FIG. 6B) where two UEs are using the same resources to communicate to the same RX-UE or in the case of two UEs are communicating with two different RX-UEs. In such cases, the two UEs using the same resources can switch between SU-MIMO and MU-MIMO based on the other UE data arrival status.

In some cases, if a UE finds out that it has no TB (or does not plan to transmit due to a lack of energy) to transmit in the next one or few Tx CG occasions, that UE may send an indication to the other TX-UEs (or to both the other TX-UEs and the RX-UE). As noted above, in some cases, the indication may explicitly indicate used or unused occasions (e.g., of a positively acknowledged TB) to these other UEs.

Figure 9:
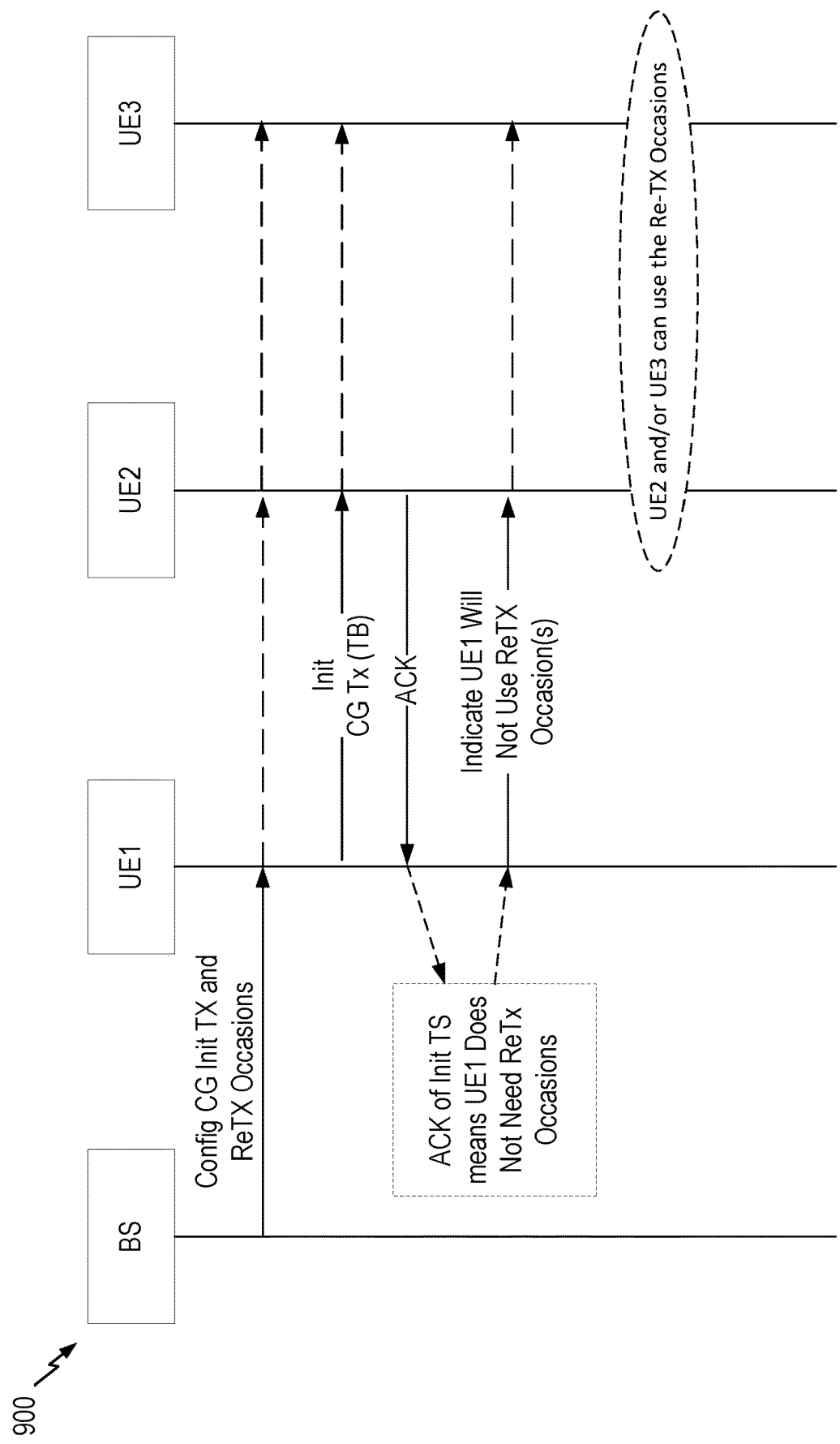
FIG. 9 depicts an call flow diagram for exploiting unutilized resources, according to various aspects described herein.

An example of this scenario is illustrated in the call flow diagram 900 of FIG. 9. In the illustrated example, a first UE (UE1) and other UEs (UE2 and UE3) are configured with a set of Init TX occasions and ReTX occasions.

In the illustrated example, UE1 sends a TB to UE2 in an initial Tx Occasion and UE2 positively acknowledges receipt of the TB (as indicated in an ACK conveyed via a PSFCH). Because UE2 ACKs the initial transmission, UE1 does not need the configured Re Tx occasions. Thus, UE1 sends an indication (e.g., to UE2 and/or UE3) that it will not use the Re Tx occasions.

In addition to skipping a Tx occasion due to not having a TB or due to receiving an ACK, a UE could skip a TX occasion if that UE is engaged in a higher priority task (e.g., in Uu link or SL). In either case, the indication sent by UE1 can include a CG index of the TX occasion(s) to be skipped, so that the UEs (UE2 and UE3) know which Tx Occasion resources are available. Based on this indication, UE2 and/or UE3 can use these resources.

The indication may be provided in any suitable signaling or messaging. For example, the indication may be conveyed via a sidelink (PC5) RRC message or MAC-CE (e.g., when the CG periodicity is relatively large) or via a physical sidelink shared channel (PSSCH) carrying the second state of a two-stage sidelink control information (SCI), or PSSCH/SCI-2. In a Mode 2 RA manner, the TX-UEs that have no data can find resources to communicate to the other UEs the (skipping) indication that they will not use a next TX occasion. As noted above, skipping an initial TX occasion also implies that the corresponding ReTx occasions can also be utilized by the other UEs. In addition, or as an alternative, in some cases, information regarding used or unused occasions may also be relayed to other UEs by an entity other than the Tx UE (e.g., by a UE, controller, or network entity/gNB) that obtained such information itself by any of the techniques described herein.

In some cases, certain resources may be dedicated for providing an indication of skipped Tx occasions. For example, as illustrated in FIG. 10, special dedicated resources may be configured (e.g., by a gNB) for each CG in order to provide this indication.

For the dedicated resources, the gNB can assign certain resources where each UE can indicate the status of using the next CG occasion. The resource size can be as small as one PRB where a TX-UE can send a 0 or 1 sequence-based encoding, which may be similar to PSFCH/PUCCH format 0. The resources may be overheard by all UEs participating in using the MU-MIMO. The dedicated resources time/frequency location can be a function (or mapped based on) a corresponding CG index.

Figure 10:
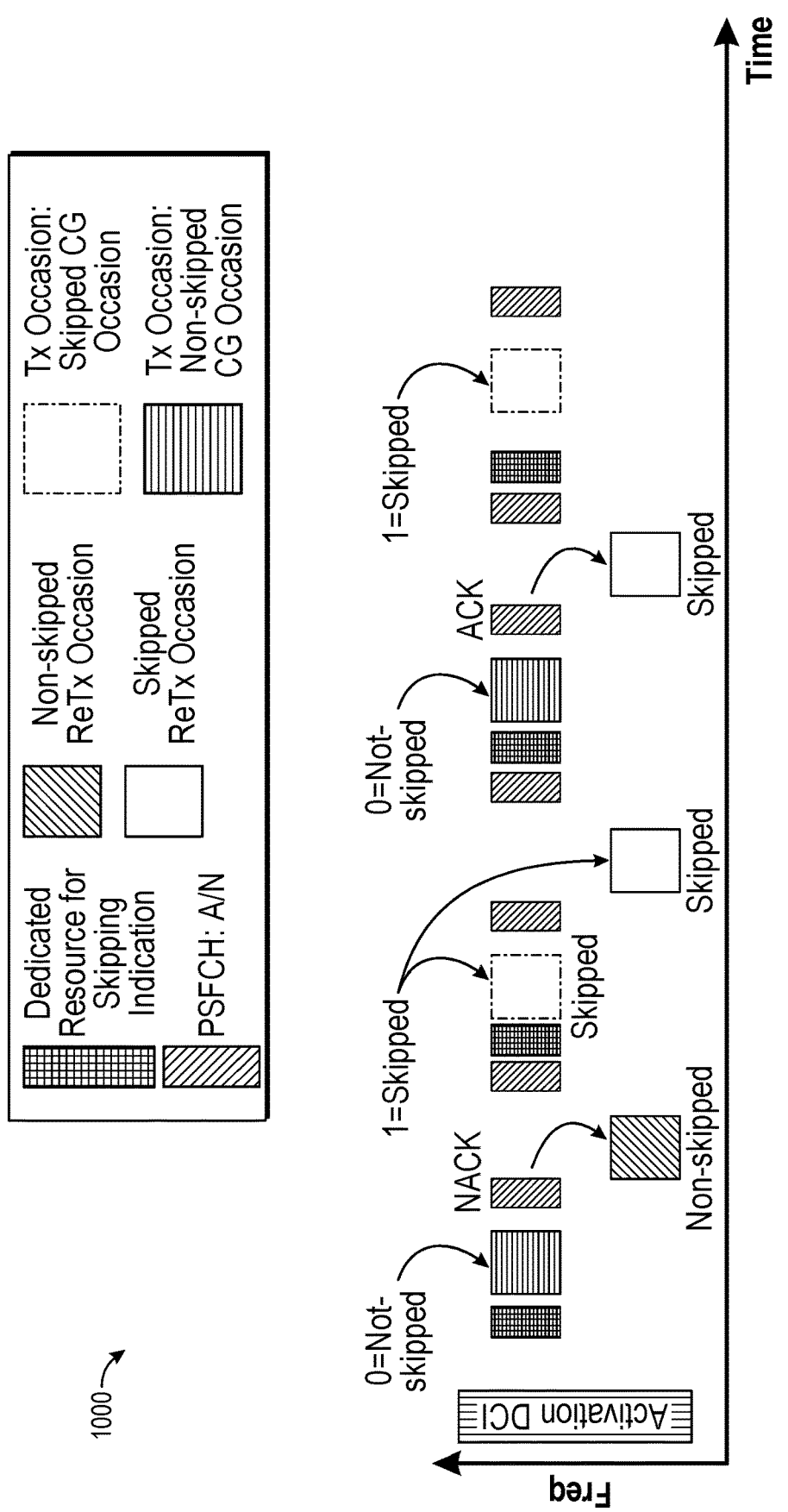
FIG. 10 depicts example sidelink CG transmission occasions with dedicated resources, according to various aspects described herein.

In the example illustrated in FIG. 10, the TX UE indicates, via the dedicated resource, that the first Init-TX CG Occasion is not going to be skipped (e.g., by indicating a 0 via sequence-based encoding). On the other hand, the TX UE indicates, via the dedicated resource, that the second Init-TX CG Occasion (and corresponding ReTX Occasion) is going to be skipped (e.g., by indicating a 1 via sequence-based encoding). In a similar manner, in the illustrated example, the TX UE also indicates that the third Init-TX CG Occasion will not be skipped (Skipping Indication=0) and that the fourth Init-TX CG Occasion will be skipped (Skipping Indication=1).

As noted above, the techniques described herein for exploiting skipped ReTx occasions may also be applied to scenarios where two Tx UEs transmit (to a receiver/RX UE) on a common set of resources. This scenario may apply in the scenario of configured grant (CG) occasions, Mode 1 RA, and Mode 2 RA.

This scenario may be understood, assuming two TX UEs (e.g., UE1 and UE2 of FIG. 6A or 6B) communicate with an RX-UE. In such cases, a ReTX occasion of one of the TX-UEs may be used by the other. For example, assuming the packet of TX-UE1 was NACK'ed by the RX UE while the packet of TX-UE2 was ACK'ed. In this case, TX-UE1 can exploit the resource or dimensions (not used by TX-UE2) for its TB retransmission.

This scenario may assume that the TX-UEs (involved in the transmissions and using the CG occasions) can overhear each other's PSFCH feedback. If the TX-UEs have been previously communicating, they may know each other's source IDs and destination IDs (since they both communicate with the same RX-UE).

In some cases, the TX-UEs sharing the CG(s) may share the source IDs or the gNB can signal this information (e.g., since the gNB is the one that assigns the resources). In some cases, the UEs can communicate with each other (e.g., using PC5-RRC/MAC-CE) to share the source ID, destination ID, and/or any other parameters used to determine the available resource. For example, in MU-MIMO PSFCH, the UEs may use the DMRS port index.

There are various options for how the TX-UEs may learn of the resources used by the other. In some cases, the UEs can share the location of the PRB(s) that each one of them will use (e.g., via a bitmap or PRB index) and the Rx-UE can inform each Tx-UE where to look to listen for (and intercept) the ACK/NACK feedback it provides to the other Tx-UE. In some cases, information regarding ACK/NACK feedback may be transmitted or relayed to other UEs. For example, an entity that obtains information regarding the resources used for ACK/NACK and/or ACK/NACK results (e.g., by sensing, intercepting, or explicit signaling) may forward this information to other UEs.

For MU-MIMO, in some cases, the port index may be used as a way to determine the (PSFCH) feedback PRB from an RX-UE. In such cases, it may be relatively easy for MU-MIMO users to determine each other's PRBs (e.g., based on feedback from Rx-UE). In some cases, the Rx-UE can directly indicate to the Tx-UEs whether to use MU-MIMO or SU MIMO in retransmission.

The techniques described herein for exploiting skipped ReTx occasions may also be applied to scenarios where more than two Tx UEs transmit (to a receiver/RX UE) on a common set of resources. This may apply to various cases, such as when TX UEs (involved in MU-MIMO) randomly use resources not utilized for ReTX or when a set of UEs not involved in a transmission use the ReTX occasions.

In the first case, when TX UEs involved in MU-MIMO randomly use resources not utilized for ReTX, the UEs may utilize the resource randomly, once an ACK is overheard. In some cases, the UEs may be ordered to use each other resources with some type of priority. For example, assuming three UEs and three ports, where each port is utilized by a UE, there may be three statuses: UE 1 will use the slot, UE 2 will not use the slot, UE 3 will use the slot. In such cases, the gNB can configure UE 1 to always use (exploit) the port of UE 2, may configure UE 3 to use (exploit) port of UE 2, or similar. In some cases, there may be a predefined behavior when a port is empty or when a certain UE' resources are not used.

When a set of UEs is not involved in using a CG for transmission, there are various options for how they can use the ReTX occasions (when available). According to a first option, the UEs can sense the resources (e.g., using "legacy" mode 2 sensing) instead of overhearing the ACK/NACK on PSFCH (e.g., if they sense the initial TX resources are not used, they may assume the corresponding ReTx resources are available). According to a second option, the UEs can overhear the PSFCH feedback (e.g., assuming they know the PSFCH RBs to listen for). A third option may be considered a combination of the first and second options. For example, the UEs may perform sensing of the TX occasions, then also listen for the PSFCH. In some cases, for a set of UEs not involved in the CG occasion, but using the ReTX resources, there may be a defined behavior or pairing between the set of UEs and a UE assigned to use the CG (owning the resources). For example, the predefined behavior may be based on some type of priority assigned the different UEs in the set. If ReTX resources are found to be available, one or more of the UEs may re-use the resources, based on the assigned priorities.

Example Operations of a User Equipment

Figure 11:
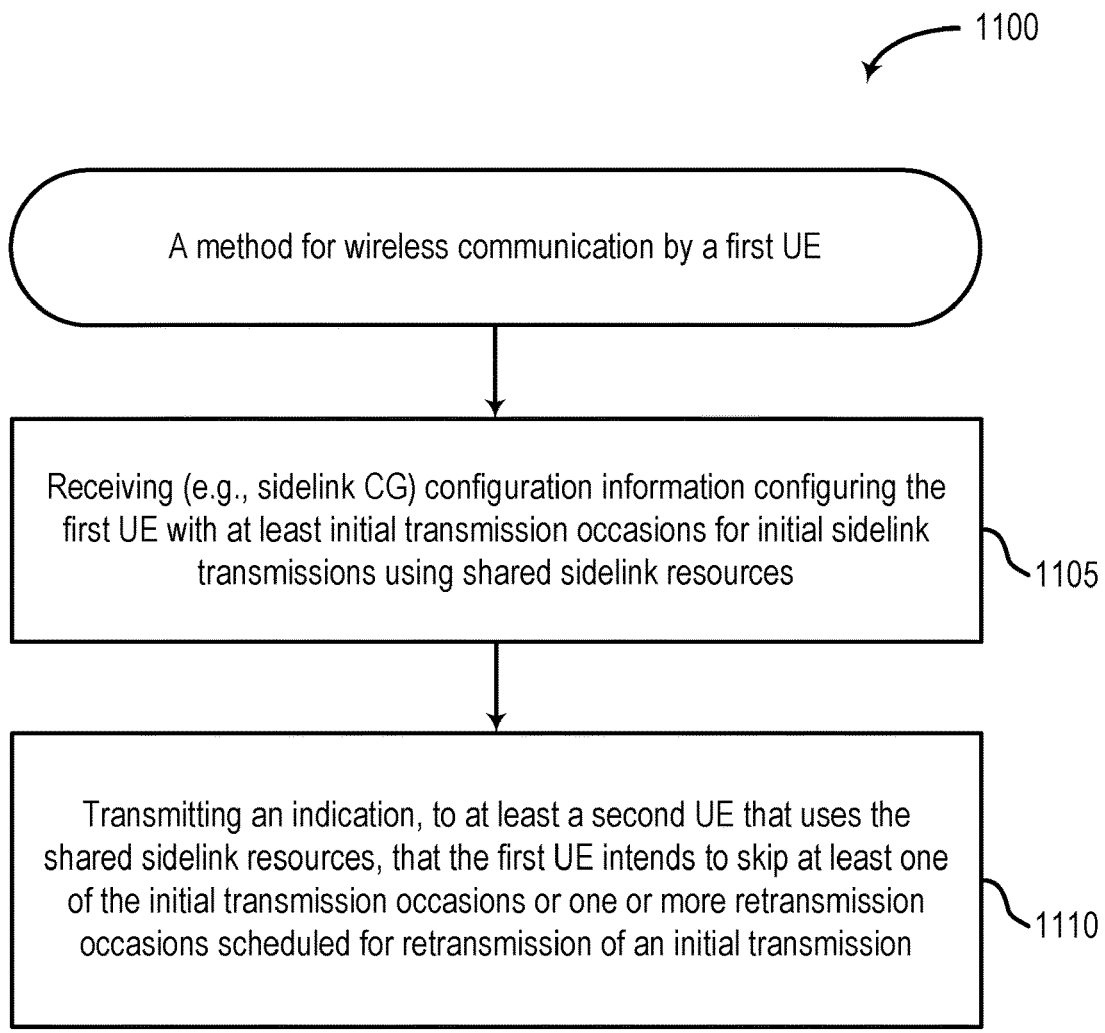
FIG. 11 depicts a method for wireless communication.

FIG. 11 shows a method 1100 for wireless communication by a UE (e.g., a first UE), such as UE 104 of FIGS. 1 and 3.

Method 1100 begins at 1105 with receiving sidelink configuration information (e.g., CG configuration information) configuring the first UE with at least initial transmission occasions for initial sidelink transmissions using shared sidelink resources. In some cases, the operations of this step refer to, or may be performed by, CG processing circuitry as described with reference to FIG. 13.

Method 1100 then proceeds to step 1110 with transmitting an indication, to at least a second UE that uses the shared sidelink resources, that the first UE intends to skip at least one of the initial transmission occasions or one or more retransmission occasions scheduled for retransmission of an initial transmission. In some cases, the operations of this step refer to, or may be performed by, resource skip indication circuitry as described with reference to FIG. 13.

Various aspects relate to the method 1100, including the following aspects.

In some aspects, the at least a second UE comprises at least one of: an intended recipient of a sidelink transmission on an initial transmission occasion or retransmission occasion the first UE indicated it will skip; or a UE that transmits on the shared sidelink resources. In some aspects, the first UE transmits the indication that the first UE intends to skip a retransmission occasion after a corresponding initial transmission was acknowledged. In some aspects, the first UE transmits the indication to indicate the first UE intends to skip an initial transmission occasion when the first UE lacks a TB for that initial transmission occasion.

In some aspects, the first UE transmits the indication to indicate the first UE intends to skip an initial transmission occasion when it is participating in higher communications on a link with a network entity or using a different set of sidelink resources.

In some aspects, the Configuration information configures the first UE with a set of transmission occasions within a period, each transmission occasion in the set having a corresponding index. In some aspects, the indication includes, for each transmission occasion the first UE intends to skip, the corresponding index identifying that transmission occasion within the set. In some aspects, method 1100 further includes transmitting the Configuration information to one or more UEs that use the shared sidelink resources. In some aspects, the indication is transmitted via at least one of: sidelink RRC or sidelink MAC-CE signaling. In some aspects, the indication is transmitted via at least one of: a PSSCH or a second stage of two-stage sidelink control information.

In some aspects, the indication is transmitted on dedicated resources, wherein the dedicated resources are at least one of: indicated in the CG configuration information; or determined as a function of transmission occasion indexes.

In some aspects, method 1100 further includes transmitting, to one or more other UEs, an indication of shared sidelink resources used by the first UE.

In some aspects, method 1100 further includes receiving an indication, from at least one other UE that uses the shared sidelink resources, that the other UE intends to skip at least one an initial transmission occasion for its own sidelink transmission or one or more retransmission occasions scheduled for retransmission of an initial transmission of its own sidelink transmission.

Figure 13:
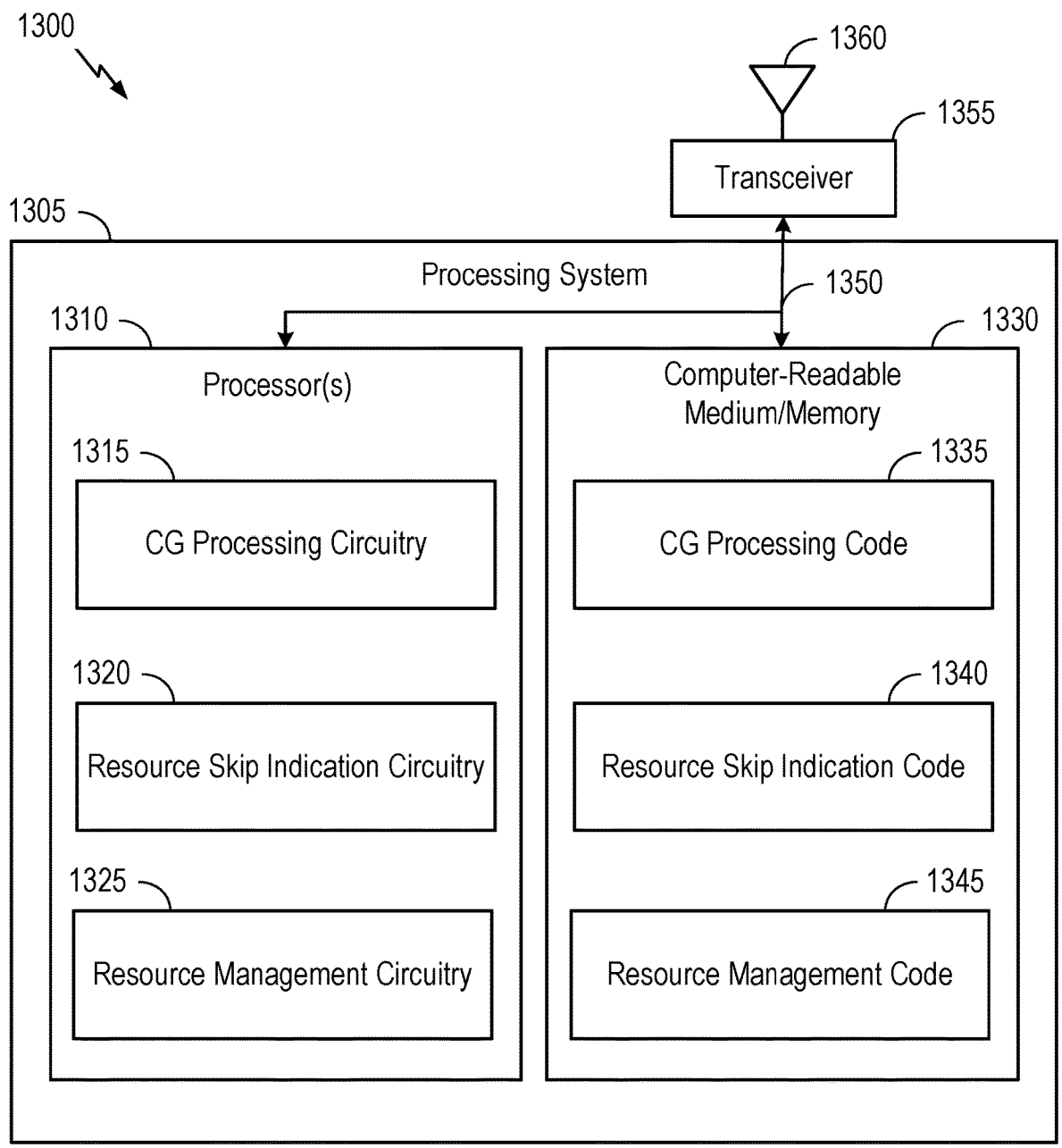
FIG. 13 depicts aspects of an example communications device.

In one aspect, method 1100, or any aspect related to it, may be performed by an apparatus, such as communications device 1300 of FIG. 13, which includes various components operable, configured, or adapted to perform the method 1100. Communications device 1300 is described below in further detail.

Note that FIG. 11 is just one example of a method, and other methods including fewer, additional, or alternative steps are possible consistent with this disclosure.

Figure 12:
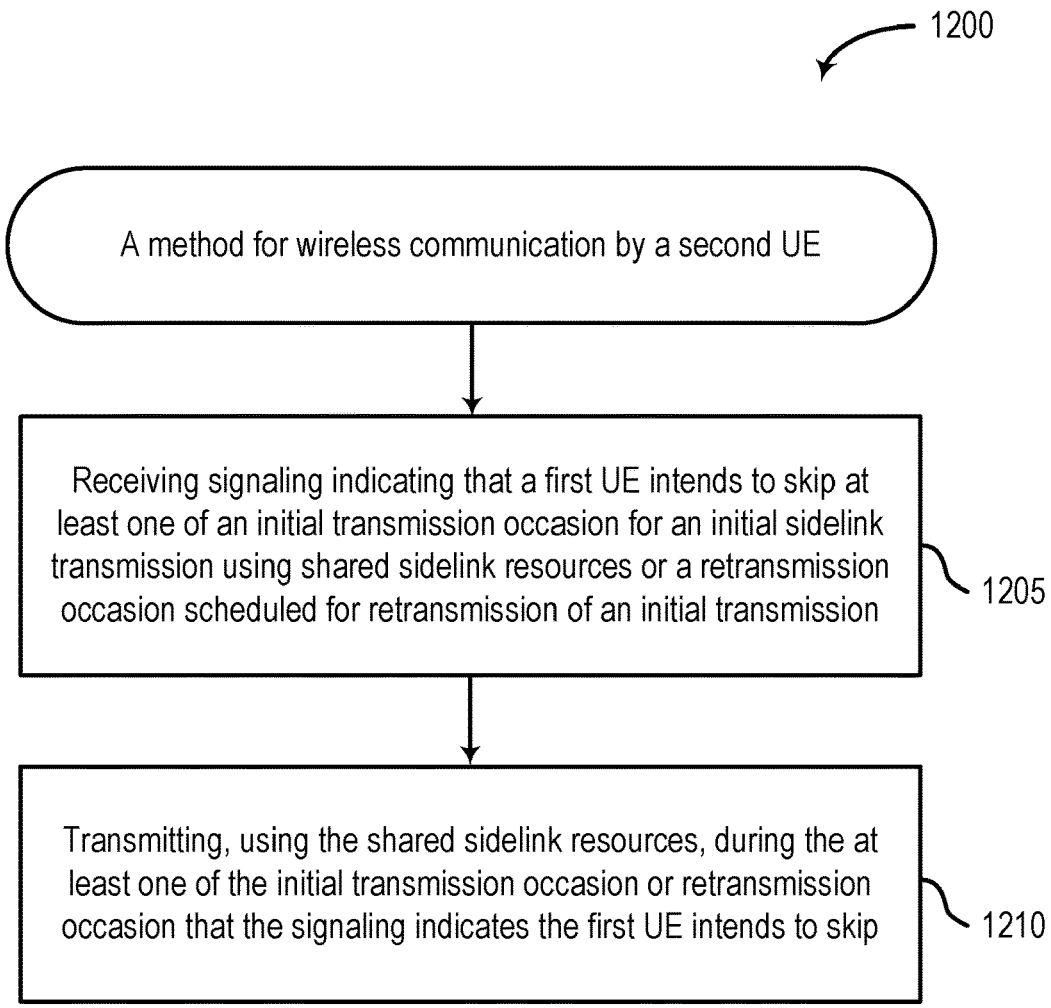
FIG. 12 depicts a method for wireless communication.

FIG. 12 shows a method 1200 for wireless communication by a UE (e.g., a second UE), such as UE 104 of FIGS. 1 and 3.

Method 1200 begins at 1205 with receiving signaling indicating that a first UE intends to skip at least one of an initial transmission occasion for an initial sidelink transmission using shared sidelink resources or a retransmission occasion scheduled for retransmission of an initial transmission. In some cases, the operations of this step refer to, or may be performed by, sidelink resource management circuitry as described with reference to FIG. 14.

Method 1200 then proceeds to step 1210 with transmitting, using the shared sidelink resources, during the at least one of the initial transmission occasion or retransmission occasion that the signaling indicates the first UE intends to skip. In some cases, the operations of this step refer to, or may be performed by, transmission circuitry as described with reference to FIG. 14.

Various aspects relate to the method 1200, including the following aspects.

In some aspects, transmitting, using the shared sidelink resources, comprises transmitting, using a first set of transmission parameters different than a second set of transmission parameters used by the second UE when the first UE transmits using the shared sidelink resources.

In some aspects, the first and second sets of transmission parameters differ in at least one of: transmission power levels, DMRS patterns, or number of ports used.

In some aspects, the transmitting comprises transmitting using a SU-MIMO mode during the at least one of the initial transmission occasion or retransmission occasion that the signaling indicates the first UE intends to skip. In some aspects, the second UE transmits using a MU-MIMO mode when the first UE transmits using the shared sidelink resources.

In some aspects, the signaling comprises an indication, received from the first UE. In some aspects, the second UE comprises at least one of: an intended recipient of a sidelink transmission on an initial transmission occasion or retransmission occasion the first UE indicated it will skip; or a UE that transmits on the shared sidelink resources.

In some aspects, method 1200 further includes receiving an indication of shared sidelink resources used by the first UE.

In some aspects, the first UE is configured, via CG information, with a set of transmission occasions within a period, each transmission occasion in the set having a corresponding index. In some aspects, the indication includes, for each transmission occasion the first UE intends to skip, the corresponding index identifying that transmission occasion within the set. In some aspects, method 1200 further includes receiving the CG information.

In some aspects, the indication is received via at least one of: sidelink RRC or sidelink MAC-CE signaling. In some aspects, the indication is received via at least one of: a PSSCH or a second stage of two-stage sidelink control information. In some aspects, the indication is received on dedicated resources, wherein the dedicated resources are at least one of: indicated in the CG information; or determined as a function of transmission occasion indexes.

In some aspects, the second UE and the first UE transmit to a third UE using the shared sidelink resources. In some aspects, the signaling comprises a PSFCH indicating the third UE has acknowledged a transmission from the first UE. In some aspects, the second UE determines, based on the PSFCH, that the first UE intends to skip a retransmission occasion scheduled for that transmission.

In some aspects, method 1200 further includes obtaining IDs of the first UE and the third UE. In some aspects, method 1200 further includes obtaining information regarding which shared sidelink resources the first UE or second UE will use. In some aspects, the IDs of the first UE and the second UE are obtained from at least one of: the first UE, the third UE, or a network entity that assigns the shared sidelink resources.

In some aspects, method 1200 further includes determining resources used for the PSFCH based on at least one of: information received from the third UE; or a port index used for the transmission acknowledged via the PSFCH. In some aspects, the transmitting comprises a retransmission during a retransmission occasion that the signaling indicates the first UE intends to skip. In some aspects, method 1200 further includes receiving an indication, from the third UE, of whether the retransmission should be sent using a SU-MIMO mode or a MU-MIMO mode.

In some aspects, at least a fourth UE also transmits to the third UE using the shared sidelink resources. In some aspects, the second UE determines when it can transmit, using the shared sidelink resources, during the retransmission occasion, based on at least one of a random selection or an order of priority assigned to the first UE, second UE, and fourth UE.

In some aspects, at least a fourth UE also transmits to the third UE using the shared sidelink resources. In some aspects, the second UE determines when it can transmit, using the shared sidelink resources, during the retransmission occasion, based on at least one of a channel sensing or detecting a PSFCH. In some aspects, method 1200 further includes determining when the second UE can transmit, using the shared sidelink resources, during the retransmission occasion, based on a relationship between UEs assigned to use a common set of CG transmission occasions.

Figure 14:
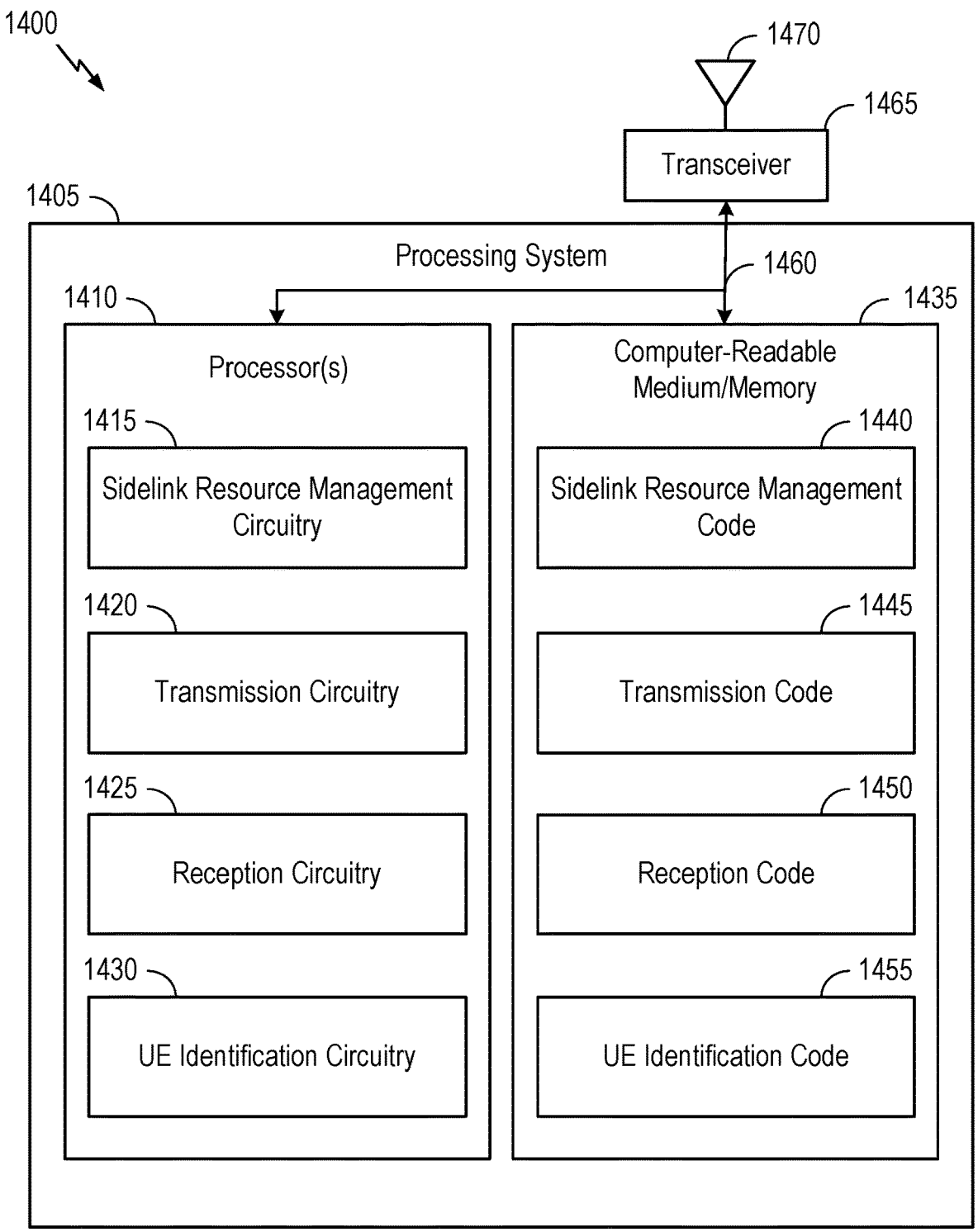
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. Communications device 1400 is described below in further detail.

Note that FIG. 12 is just one example of a method, and other methods including fewer, additional, or alternative steps are possible consistent with this disclosure.

Example Communications Devices

FIG. 13 depicts aspects of an example communications device 1300. In some aspects, communications device 1300 is a user equipment (e.g., a first UE), such as UE 104 described above with respect to FIGS. 1 and 3.

The communications device 1300 includes a processing system 1305 coupled to the transceiver 1355 (e.g., a transmitter and/or a receiver). The transceiver 1355 is configured to transmit and receive signals for the communications device 1300 via the antenna 1360, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it. Note that reference to a processor performing a function of communications device 1300 may include one or more processors 1310 performing that function of communications device 1300.

In the depicted example, computer-readable medium/memory 1330 stores code (e.g., executable instructions), such as CG processing code 1335, resource skip indication code 1340, and resource management code 1345. Processing of the CG processing code 1335, resource skip indication code 1340, and resource management code 1345 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry such as CG processing circuitry 1315, resource skip indication circuitry 1320, and resource management circuitry 1325. Processing with CG processing circuitry 1315, resource skip indication circuitry 1320, and resource management circuitry 1325 may cause the communications device 1300 to perform the method 1100 described with respect to FIG. 11, or any aspect related to it.

Various components of the communications device 1300 may provide means for performing the method 1100 described with respect to FIG. 11, or any aspect related to it. For example, means for transmitting, sending or outputting for transmission may include transceivers 354 and/or antenna(s) 352 of the UE 104 illustrated in FIG. 3 and/or the transceiver 1355 and the antenna 1360 of the communications device 1300 in FIG. 13. Means for receiving or obtaining may include transceivers 354 and/or antenna(s) 352 of the UE 104 illustrated in FIG. 3 and/or the transceiver 1355 and the antenna 1360 of the communications device 1300 in FIG. 13.

According to some aspects, CG processing circuitry 1315 receives sidelink Configuration information configuring the first UE with at least initial transmission occasions for initial sidelink transmissions using shared sidelink resources. According to some aspects, resource skip indication circuitry 1320 transmits an indication, to at least a second UE that uses the shared sidelink resources, that the first UE intends to skip at least one of the initial transmission occasions or one or more retransmission occasions scheduled for retransmission of an initial transmission.

In some aspects, the Configuration information configures the first UE with a set of transmission occasions within a period, each transmission occasion in the set having a corresponding index. According to some aspects, CG processing circuitry 1315 transmits the Configuration information to one or more UEs that use the shared sidelink resources.

In some examples, resource management circuitry 1325 transmits, to one or more other UEs, an indication of shared sidelink resources used by the first UE. In some examples, resource management circuitry 1325 receives an indication, from at least one other UE that uses the shared sidelink resources, that the other UE intends to skip at least one an initial transmission occasion for its own sidelink transmission or one or more retransmission occasions scheduled for retransmission of an initial transmission of its own sidelink transmission.

FIG. 14 depicts aspects of an example communications device 1400. In some aspects, communications device 1400 is a user equipment (e.g., a second UE), such as UE 104 described above with respect to FIGS. 1 and 3.

The communications device 1400 includes a processing system 1405 coupled to the transceiver 1465 (e.g., a transmitter and/or a receiver). The transceiver 1465 is configured to transmit and receive signals for the communications device 1400 via the antenna 1470, such as the various signals as described herein. The processing system 1405 may be configured to perform processing functions for the communications device 1400, including processing signals received and/or to be transmitted by the communications device 1400.

The processing system 1405 includes one or more processors 1410. In various aspects, the one or more processors 1410 may be representative of one or more of receive processor 358, transmit processor 364, TX MIMO processor 366, and/or controller/processor 380, as described with respect to FIG. 3. The one or more processors 1410 are coupled to a computer-readable medium/memory 1435 via a bus 1460. In certain aspects, the computer-readable medium/memory 1435 is configured to store instructions (e.g., computer-executable code) that when executed by the one or more processors 1410, cause the one or more processors 1410 to perform the method 1200 described with respect to FIG. 12, or any aspect related to it. Note that reference to a processor performing a function of communications device 1400 may include one or more processors 1410 performing that function of communications device 1400.

In the depicted example, computer-readable medium/memory 1435 stores code (e.g., executable instructions), such as sidelink resource management code 1440, transmission code 1445, reception code 1450, and UE identification code 1455. Processing of the sidelink resource management code 1440, transmission code 1445, reception code 1450, and UE identification code 1455 may cause the communications device 1400 to perform the method 1200 described with respect to FIG. 12, or any aspect related to it.

The one or more processors 1410 include circuitry configured to implement (e.g., execute) the code stored in the computer-readable medium/memory 1435, including circuitry such as sidelink resource management circuitry 1415, transmission circuitry 1420, reception circuitry 1425, and UE identification circuitry 1430. Processing with sidelink resource management circuitry 1415, transmission circuitry 1420, reception circuitry 1425, and UE identification circuitry 1430 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3 and/or the transceiver 1465 and the antenna 1470 of the communications device 1400 in FIG. 14. Means for receiving or obtaining may include transceivers 354 and/or antenna(s) 352 of the UE 104 illustrated in FIG. 3 and/or the transceiver 1465 and the antenna 1470 of the communications device 1400 in FIG. 14.

According to some aspects, sidelink resource management circuitry 1415 receives signaling indicating that a first UE intends to skip at least one of an initial transmission occasion for an initial sidelink transmission using shared sidelink resources or a retransmission occasion scheduled for retransmission of an initial transmission. According to some aspects, transmission circuitry 1420 transmits, using the shared sidelink resources, during the at least one of the initial transmission occasion or retransmission occasion that the signaling indicates the first UE intends to skip.

In some aspects, transmitting, using the shared sidelink resources, comprises transmitting, using a first set of transmission parameters different than a second set of transmission parameters used by the second UE when the first UE transmits using the shared sidelink resources. In some aspects, the first and second sets of transmission parameters differ in at least one of: transmission power levels, DMRS patterns, or number of ports used. In some aspects, the transmitting includes transmitting using a SU-MIMO mode during the at least one of the initial transmission occasion or retransmission occasion that the signaling indicates the first UE intends to skip. In some aspects, the second UE transmits using a MU-MIMO mode when the first UE transmits using the shared sidelink resources. In some aspects, the signaling includes an indication, received from the first UE. In some aspects, the second UE includes at least one of: an intended recipient of a sidelink transmission on an initial transmission occasion or retransmission occasion the first UE indicated it will skip; or a UE that transmits on the shared sidelink resources.

According to some aspects, reception circuitry 1425 receives an indication of shared sidelink resources used by the first UE. In some aspects, the first UE is configured, via CG information, with a set of transmission occasions within a period, each transmission occasion in the set having a corresponding index. In some aspects, the indication includes, for each transmission occasion the first UE intends to skip, the corresponding index identifying that transmission occasion within the set.

In some examples, reception circuitry 1425 receives the CG information. In some aspects, the indication is received via at least one of: sidelink RRC or sidelink MAC-CE signaling. In some aspects, the indication is received via at least one of: a PSSCH or a second stage of two-stage sidelink control information. In some aspects, the indication is received on dedicated resources, where the dedicated resources are at least one of: indicated in the CG information; or determined as a function of transmission occasion indexes. In some aspects, the second UE and the first UE transmit to a third UE using the shared sidelink resources. In some aspects, the signaling includes a PSFCH indicating the third UE has acknowledged a transmission from the first UE. In some aspects, the second UE determines, based on the PSFCH, that the first UE intends to skip a retransmission occasion scheduled for that transmission. In some examples, sidelink resource management circuitry 1415 determines resources used for the PSFCH based on at least one of: information received from the third UE; or a port index used for the transmission acknowledged via the PSFCH.

According to some aspects, UE identification circuitry 1430 obtains IDs of the first UE and the third UE. In some examples, UE identification circuitry 1430 obtains information regarding which shared sidelink resources the first UE or second UE will use. In some aspects, the IDs of the first UE and the second UE are obtained from at least one of: the first UE, the third UE, or a network entity that assigns the shared sidelink resources. In some aspects, the transmitting includes a retransmission during a retransmission occasion that the signaling indicates the first UE intends to skip. In some examples, reception circuitry 1425 receives an indication, from the third UE, of whether the retransmission should be sent using a SU-MIMO mode or a MU-MIMO mode. In some aspects, at least a fourth UE also transmits to the third UE using the shared sidelink resources. In some aspects, the second UE determines when it can transmit, using the shared sidelink resources, during the retransmission occasion, based on at least one of a random selection or an order of priority assigned to the first UE, second UE, and fourth UE. In some aspects, at least a fourth UE also transmits to the third UE using the shared sidelink resources. In some aspects, the second UE determines when it can transmit, using the shared sidelink resources, during the retransmission occasion, based on at least one of a channel sensing or detecting a PSFCH. In some examples, sidelink resource management circuitry 1415 determines when the second UE can transmit, using the shared sidelink resources, during the retransmission occasion, based on a relationship between UEs assigned to use a common set of CG transmission occasions.

Example Clauses

Implementation examples are described in the following numbered clauses:

Clause 1: A method for wireless communications by a first UE, comprising: receiving sidelink Configuration information configuring the first UE with at least initial transmission occasions for initial sidelink transmissions using shared sidelink resources and transmitting an indication, to at least a second UE that uses the shared sidelink resources, that the first UE intends to skip at least one of the initial transmission occasions or one or more retransmission occasions scheduled for retransmission of an initial transmission.

Clause 2: The method of Clause 1, wherein the at least a second UE comprises at least one of: an intended recipient of a sidelink transmission on an initial transmission occasion or retransmission occasion the first UE indicated it will skip; or a UE that transmits on the shared sidelink resources.

Clause 3: The method of any one of Clauses 1 and 2, wherein the first UE transmits the indication that the first UE intends to skip a retransmission occasion after a corresponding initial transmission was acknowledged.

Clause 4: The method of any one of Clauses 1-3, wherein the first UE transmits the indication to indicate the first UE intends to skip an initial transmission occasion when the first UE lacks a TB for that initial transmission occasion.

Clause 5: The method of any one of Clauses 1-4, wherein the first UE transmits the indication to indicate the first UE intends to skip an initial transmission occasion when it is participating in higher communications on a link with a network entity or using a different set of sidelink resources.

Clause 6: The method of any one of Clauses 1-5, wherein: the configuration information configures the first UE with a set of transmission occasions within a period, each transmission occasion in the set having a corresponding index; and the indication includes, for each transmission occasion the first UE intends to skip, the corresponding index identifying that transmission occasion within the set.

Clause 7: The method of Clause 6, further comprising: transmitting the configuration information to one or more UEs that use the shared sidelink resources.

Clause 8: The method of Clause 6, wherein the indication is transmitted via at least one of: sidelink RRC or sidelink MAC-CE signaling.

Clause 9: The method of Clause 6, wherein the indication is transmitted via at least one of: a PSSCH or a second stage of two-stage sidelink control information.

Clause 10: The method of Clause 6, wherein the indication is transmitted on dedicated resources, wherein the dedicated resources are at least one of: indicated in the CG configuration information; or determined as a function of transmission occasion indexes.

Clause 11: The method of Clause 6, further comprising: transmitting, to one or more other UEs, an indication of shared sidelink resources used by the first UE.

Clause 12: The method of any one of Clauses 1-11, further comprising: receiving an indication, from at least one other UE that uses the shared sidelink resources, that the other UE intends to skip at least one an initial transmission occasion for its own sidelink transmission or one or more retransmission occasions scheduled for retransmission of an initial transmission of its own sidelink transmission.

Clause 13: A method for wireless communications by a second UE, comprising: receiving signaling indicating that a first UE intends to skip at least one of an initial transmission occasion for an initial sidelink transmission using shared sidelink resources or a retransmission occasion scheduled for retransmission of an initial transmission and transmitting, using the shared sidelink resources, during the at least one of the initial transmission occasion or retransmission occasion that the signaling indicates the first UE intends to skip.

Clause 14: The method of Clause 13, wherein transmitting, using the shared sidelink resources, comprises: transmitting, using a first set of transmission parameters different than a second set of transmission parameters used by the second UE when the first UE transmits using the shared sidelink resources.

Clause 15: The method of Clause 14, wherein the first and second sets of transmission parameters differ in at least one of: transmission power levels, DMRS patterns, or number of ports used.

Clause 16: The method of any one of Clauses 13-15, wherein: the transmitting comprises transmitting using a SU-MIMO mode during the at least one of the initial transmission occasion or retransmission occasion that the signaling indicates the first UE intends to skip; and the second UE transmits using a MU-MIMO mode when the first UE transmits using the shared sidelink resources.

Clause 17: The method of any one of Clauses 13-16, wherein the signaling comprises an indication, received from the first UE.

Clause 18: The method of Clause 17, wherein the second UE comprises at least one of: an intended recipient of a sidelink transmission on an initial transmission occasion or retransmission occasion the first UE indicated it will skip; or a UE that transmits on the shared sidelink resources.

Clause 19: The method of Clause 18, further comprising: receiving an indication of shared sidelink resources used by the first UE.

Clause 20: The method of Clause 17, wherein: the first UE is configured, via CG information, with a set of transmission occasions within a period, each transmission occasion in the set having a corresponding index; and the indication includes, for each transmission occasion the first UE intends to skip, the corresponding index identifying that transmission occasion within the set.

Clause 21: The method of Clause 20, further comprising: receiving the CG information.

Clause 22: The method of Clause 20, wherein the indication is received via at least one of: sidelink RRC or sidelink MAC-CE signaling.

Clause 23: The method of Clause 20, wherein the indication is received via at least one of: a PSSCH or a second stage of two-stage sidelink control information.

Clause 24: The method of Clause 20, wherein the indication is received on dedicated resources, wherein the dedicated resources are at least one of: indicated in the CG information; or determined as a function of transmission occasion indexes.

Clause 25: The method of any one of Clauses 13-24, wherein: the second UE and the first UE transmit to a third UE using the shared sidelink resources; the signaling comprises a PSFCH indicating the third UE has acknowledged a transmission from the first UE; and the second UE determines, based on the PSFCH, that the first UE intends to skip a retransmission occasion scheduled for that transmission.

Clause 26: The method of Clause 25, further comprising: obtaining IDs of the first UE and the third UE.

Clause 27: The method of Clause 26, further comprising: obtaining information regarding which shared sidelink resources the first UE or second UE will use.

Clause 28: The method of Clause 25, wherein the IDs of the first UE and the second UE are obtained from at least one of: the first UE, the third UE, or a network entity that assigns the shared sidelink resources.

Clause 29: The method of Clause 25, further comprising: determining resources used for the PSFCH based on at least one of: information received from the third UE; or a port index used for the transmission acknowledged via the PSFCH.

Clause 30: The method of Clause 25, wherein: the transmitting comprises a retransmission during a retransmission occasion that the signaling indicates the first UE intends to skip; and the method further comprises receiving an indication, from the third UE, of whether the retransmission should be sent using a SU-MIMO mode or a MU-MIMO mode.

Clause 31: The method of Clause 25, wherein: at least a fourth UE also transmits to the third UE using the shared sidelink resources; and the second UE determines when it can transmit, using the shared sidelink resources, during the retransmission occasion, based on at least one of a random selection or an order of priority assigned to the first UE, second UE, and fourth UE.

Clause 32: The method of Clause 25, wherein: at least a fourth UE also transmits to the third UE using the shared sidelink resources; and the second UE determines when it can transmit, using the shared sidelink resources, during the retransmission occasion, based on at least one of a channel sensing or detecting a PSFCH.

Clause 33: The method of Clause 32, further comprising: determining when the second UE can transmit, using the shared sidelink resources, during the retransmission occasion, based on a relationship between UEs assigned to use a common set of CG transmission occasions.

Clause 34: A processing system, comprising: a memory comprising computer-executable instructions; one or more processors configured to execute the computer-executable instructions and cause the processing system to perform a method in accordance with any one of Clauses 1-33.

Clause 35: A processing system, comprising means for performing a method in accordance with any one of Clauses 1-33.

Clause 36: A non-transitory computer-readable medium comprising computer-executable instructions that, when executed by one or more processors of a processing system, cause the processing system to perform a method in accordance with any one of Clauses 1-33.

Clause 37: A computer program product embodied on a computer-readable storage medium comprising code for performing a method in accordance with any one of Clauses 1-33.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a first user equipment (UE), the method comprising:
   receiving sidelink configuration information configuring the first UE with at least an initial transmission occasion for an initial sidelink transmission, to a third UE, using shared sidelink resources that are shared with at least a second UE;
   transmitting the initial sidelink transmission to the third UE in the initial transmission occasion;
   receiving an acknowledgment, from the third UE, for the initial sidelink transmission; and
   transmitting, to at least the second UE in response to receiving the acknowledgment from the third UE, an indication that the first UE intends to skip one or more retransmission occasions for retransmission of the initial transmission.

2. The method of claim 1, wherein:
   the sidelink configuration information configures the first UE with a set of transmission occasions within a period, each transmission occasion in the set of transmission occasions having a corresponding index; and
   the indication includes, for each transmission occasion the first UE intends to skip, the corresponding index identifying that transmission occasion within the set.

3. The method of claim 2, wherein the indication is transmitted on dedicated resources, and wherein the dedicated resources are at least one of:
   indicated in the sidelink configuration information; or
   determined as a function of the corresponding transmission occasion indexes.

4. The method of claim 2, further comprising transmitting, to one or more other UEs, an indication of shared sidelink resources used by the first UE.

5. The method of claim 1, further comprising receiving an indication, from at least one other UE that uses the shared sidelink resources, that the other UE intends to skip at least one of: an initial transmission occasion for an initial sidelink transmission to the third UE or one or more retransmission occasions for retransmission of the initial sidelink transmission to the third UE.

6. The method of claim 1, wherein the indication is transmitted via at least one of: a physical sidelink shared channel (PSSCH) or a second stage of two-stage sidelink control information.

7. The method of claim 1, further comprising transmitting the sidelink configuration information to one or more UEs that use the shared sidelink resources.

8. The method of claim 1, wherein the indication is transmitted via at least one of: sidelink radio resource control (RRC) or sidelink medium access control (MAC) control element (CE) signaling.

9. A method for wireless communications by a second user equipment (UE), the method comprising:
   receiving signaling from a first UE indicating that the first UE intends to skip at least one of: an initial transmission occasion for an initial sidelink transmission, to a third UE, using shared sidelink resources or a retransmission occasion scheduled for retransmission of the initial transmission; and
   transmitting a sidelink transmission to the third UE, using the shared sidelink resources, during the indicated at least one of: the initial transmission occasion or the retransmission occasion in response to receiving the signaling.

10. The method of claim 9, wherein the transmitting the sidelink transmission to the third UE, using the shared sidelink resources, comprises transmitting the sidelink transmission to the third UE, using a first set of transmission parameters different than a second set of transmission parameters used by the second UE when the first UE transmits using the shared sidelink resources.

11. The method of claim 10, wherein the first set of transmission parameters and the second set of transmission parameters differ in at least one of: transmission power levels, demodulation reference signal (DMRS) patterns, or number of ports used.

12. The method of claim 9, wherein the transmitting the sidelink transmission to the third UE comprises transmitting the sidelink transmission to the third UE using a single user multiple input multiple output (SU-MIMO) mode during the indicated at least one of: the initial transmission occasion or the retransmission occasion, the method further comprising:

transmitting, to the third UE, another sidelink transmission using a multiple user multiple input multiple output (MU-MIMO) mode in a sidelink transmission occasion in which the first UE transmits using the shared sidelink resources.

13. The method of claim 9, further comprising determining when to transmit, using the shared sidelink resources, during the sidelink retransmission occasion, wherein the determining is based on a relationship between UEs assigned to use a common set of configured grant (CG) transmission occasions.

14. The method of claim 9, further comprising receiving configuration information with a set of transmission occasions within a period, each transmission occasion in the set having a corresponding index, wherein the indication includes, for each transmission occasion the first UE intends to skip, the corresponding index identifying that transmission occasion within the set of transmission occasions.

15. The method of claim 9, wherein the indication is received via at least one of: sidelink radio resource control (RRC) or sidelink medium access control (MAC) control element (CE) signaling.

16. The method of claim 9, wherein the indication is received via at least one of: a physical sidelink shared channel (PSSCH) or a second stage of two-stage sidelink control information.

17. The method of claim 9, wherein the indication is received on dedicated resources, and wherein the dedicated resources are at least one of:

indicated in the configuration information; or determined as a function of the corresponding transmission occasion indexes.

18. The method of claim 9, further comprising receiving an indication of shared sidelink resources used by the first UE.

19. The method of claim 9, wherein the signaling comprises a physical sidelink feedback channel (PSFCH), from the third UE, indicating the third UE has acknowledged a transmission from the first UE.

20. The method of claim 19, further comprising obtaining identifiers (IDs) of the first UE and the third UE.

21. The method of claim 20, further comprising obtaining information regarding which shared sidelink resources the first UE.

22. The method of claim 19, further comprising determining resources used for the PSFCH based on at least one of:

information received from the third UE; or a port index used for the transmission acknowledged via the PSFCH.

23. The method of claim 19, wherein the transmitting comprises transmitting a sidelink retransmission during the indicated sidelink retransmission occasion, wherein the method further comprises:

receiving an indication, from the third UE, of whether to transmit the retransmission using a single user multiple input multiple output (SU-MIMO) mode or a multiple input multiple output (MU-MIMO) mode.

24. The method of claim 19, wherein at least a fourth UE transmits to the third UE using the shared sidelink resources, the method further comprising:

determining when to transmit, using the shared sidelink resources, during the sidelink retransmission occasion, wherein the determining is based on at least one of: a random selection or an order of priority assigned to the first UE, the second UE, and the fourth UE.

25. The method of claim 19, wherein at least a fourth UE transmits to the third UE using the shared sidelink resources, the method further comprising:

determining when to transmit, using the shared sidelink resources, during the sidelink retransmission occasion, wherein the determining is based on at least one of: a channel sensing or detecting a physical sidelink feedback channel (PSFCH).

26. The method of claim 19, wherein the IDs of the first UE and the second UE are obtained from at least one of: the first UE, the third UE, or a network entity that assigns the shared sidelink resources.

27. A first user equipment (UE) configured for wireless communication, the first UE comprising:

a memory comprising computer-executable instructions; and one or more processors configured to execute the computer-executable instructions and, individually or collectively, cause the first UE to:

receive sidelink configuration information configuring the first UE with at least an initial transmission occasion for an initial sidelink transmission, to a third UE, using shared sidelink resources that are shared with at least a second UE;

transmit the initial sidelink transmission to the third UE in the initial transmission occasion;

receive an acknowledgment, from the third UE, for the initial sidelink transmission; and transmit, to at least the second UE in response to receiving the acknowledgment from the third UE, an indication that the first UE intends to skip one or more retransmission occasions for retransmission of the initial transmission.

28. A second user equipment (UE) configured for wireless communication, the second UE comprising:

a memory comprising computer-executable instructions; and one or more processors configured to execute the computer-executable instructions and, individually or collectively, cause the second UE to:

receive signaling from a first UE indicating that the first UE intends to skip at least one of: an initial transmission occasion for an initial sidelink transmission, to a third UE, using shared sidelink resources or a retransmission occasion scheduled for retransmission of the initial transmission; and transmit a sidelink transmission to the third UE, using the shared sidelink resources, during the indicated at least one of: the initial transmission occasion or the retransmission occasion in response to receiving the signaling.

\* \* \* \* \*